United States Patent
Hidaka et al.

(10) Patent No.: US 6,546,713 B1
(45) Date of Patent: Apr. 15, 2003

(54) GAS TURBINE FOR POWER GENERATION, AND COMBINED POWER GENERATION SYSTEM

(75) Inventors: Kishio Hidaka, Hitachiohta (JP); Shigeyoshi Nakamura, Hitachinaka (JP); Yutaka Fukui, Hitachi (JP); Masao Shiga, Hitachiohta (JP); Ryo Hiraga, Hitachiohta (JP); Hajime Toriya, Hitachi (JP); Toshio Fujita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/555,882
(22) PCT Filed: Dec. 15, 1997
(86) PCT No.: PCT/JP97/04609
§ 371 (c)(1),
(2), (4) Date: Jun. 8, 2000
(87) PCT Pub. No.: WO99/31365
PCT Pub. Date: Jun. 24, 1999

(51) Int. Cl.[7] .............................. F02C 6/18; F02C 7/16
(52) U.S. Cl. ..................................... 60/39.182; 60/806
(58) Field of Search .......................... 60/39.182, 39.75, 60/806; 415/114, 115

(56) References Cited

U.S. PATENT DOCUMENTS

| | | | | |
|---|---|---|---|---|
| 4,424,668 A | * | 1/1984 | Mukherjee | 60/39.182 |
| 4,988,266 A | * | 1/1991 | Nakamura et al. | 415/173.1 |
| 5,340,274 A | * | 8/1994 | Cunha | 415/115 |
| 5,611,670 A | * | 3/1997 | Yoshinari et al. | 416/241 R |
| 5,695,319 A | * | 12/1997 | Matsumoto et al. | 415/115 |
| 5,758,487 A | * | 6/1998 | Salt et al. | 60/39.75 |
| 6,065,282 A | * | 5/2000 | Fukue et al. | 60/39.75 |

FOREIGN PATENT DOCUMENTS

| | | |
|---|---|---|
| JP | 63-60262 | 3/1988 |
| JP | 4-75133 | 6/1992 |
| JP | 5-263657 | 10/1993 |
| JP | 7-301127 | 11/1995 |
| JP | 7-324631 | 12/1995 |
| JP | 2544453 | 7/1996 |

OTHER PUBLICATIONS

"Course 3 by Thermal and New Nuclear Power Engineering Society Turbine and Generator", Thermal and New Nuclear Power Engineering Society, Aug. 1995, pp. 47–108, pp. 154–194.

"Course 10 by Thermal and New Nuclear Power Engineering Society Combined Cycle Power Generation" Thermal and New Nuclear Power Engineering Society, Jun., 1985, pp. 31–96, pp. 115–132.

(List continued on next page.)

Primary Examiner—Louis J. Casaregola

(57) ABSTRACT

A gas turbine for power generation operated at a turbine nozzle inlet temperature ranging from 1200 to 1650° C., which is improved to obtain a high heat efficiency by making disk blades and nozzles arranged in first to final stages from optimum materials and optimally cooling these disk blades and nozzles, and to obtain a combined power generation system using the gas turbine.

The combined power generation system includes a highly efficient gas turbine operated at a turbine nozzle inlet combustion gas temperature ranging from 1200 to 1650° C., and a high pressure-intermediate pressure-low pressure integral type steam turbine operated at a steam inlet temperature of 530° C. or more, wherein the gas turbine is configured such that turbine blades, nozzles and disks are each cooled, and the blades and nozzles are each made from an Ni-based alloy having a single crystal or columnar crystal structure and disks are made from a martensite steel.

7 Claims, 13 Drawing Sheets

OTHER PUBLICATIONS

"Cooling of Gas Turbine Blade by New Medium Cooling Method", Journal of the Gas Turbine Society of Japan, vol. 20, No. 80, Mar. 1993, S. Kobata, pp. 41–48.

"Progress of Precision Casting Technique: Crystal Control Technique, Fine Grain Technique, etc." Journal of the Gas Turbine Society of Japan, Y. Ota et al, vol. 23, No. 91, Dec., 1995, pp. 19–26.

* cited by examiner

GAS TURBINE FOR POWER GENERATION, AND COMBINED POWER GENERATION SYSTEM

TECHNICAL FIELD

The present invention relates to a new gas turbine for power generation, which is capable of enhancing the heat efficiency by increasing a turbine inlet temperature up to 1200° C. or more, and a combined power generation system using the gas turbine.

BACKGROUND ART

In recent years, it is expected to improve the heat efficiency of a gas turbine from the viewpoint of energy saving. To improve the heat efficiency of a gas turbine, it is most effective to increase the gas temperature and gas pressure thereof. For example, by increasing the gas temperature from 1200° C. to 1650° C. and also increasing the gas compression ratio to about 15, it is possible to make the heat efficiency larger than that of the conventional gas turbine operated at 1200° C. or less by about 3% or more.

Along with the increases in gas temperature and gas compression ratio, however, it is required to use materials having higher strengths, particularly, higher creep rupture strengths which exert the largest effect on the high temperature characteristics of the materials. In general, an austenite steel, an Ni-based alloy, a Co-based alloy, and a martensite steel are known as structural materials higher in creep rupture strength. Of these materials, the Ni-based alloy and Co-based alloy are undesirable in terms of hot workability, machinability, and vibration damping property; and the austenite steel is also undesirable in terms of poor high-temperature strength at a temperature ranging from 400 to 450° C. and of matching with the entire material configuration of the gas turbine. On the other hand, the martensite steel is desirable in matching with materials of other components of the gas turbine and also sufficient in high-temperature strength. The use of the martensite steel has been known, for example, from Japanese Patent Laid-open Nos. Sho 63-60262 and Hei 5-263657. The martensite steel disclosed in these documents, however, is not necessarily high in creep rupture strength at a temperature ranging from 400 to 500° C., and therefore, it cannot be used as the material as it is for a turbine disk or the like provided in a gas turbine operated at a high temperature.

To meet the requirement to increase the gas temperature and gas pressure of a gas turbine, it is insufficient to use materials which are only high in strength. To be more specific, to cope with the tendency to increase the gas temperature of a gas turbine, it is required to use heat-resistant materials which are high not only in strength but also in toughness. In general, however, if the strength of a material is increased, the toughness thereof is reduced.

Accordingly, it is generally difficult to obtain a martensite steel which is high in both strength and toughness.

An object of the present invention is to provide a gas turbine for power generation, which is improved to increase the heat efficiency and also increase the gas temperature by combination of the use of a material high in both strength and toughness and a technique of cooling the gas turbine, and to provide a combined power generation system of the gas turbine and a steam turbine combined therewith.

DISCLOSURE OF INVENTION

According to the present invention, there is provided a gas turbine for power generation, including a compressor, a combustor, three stages or more turbine blades fixed to turbine disks, and three stages or more turbine nozzles provided in matching with the turbine blades, characterized in that the gas turbine has an air cooling line for cooling the turbine disks in a range from shells of the turbine disks to the turbine blades by using air compressed by the compressor; and the turbine disks are each made from a martensite steel.

According to the present invention, there is also provided a gas turbine for power generation, including a compressor, a combustor, three stages or more turbine blades fixed to turbine disks, and three stages or more turbine nozzles provided in matching with the turbine blades, characterized in that the gas turbine has a steam cooling line for cooling the turbine disks in a range from shells of the turbine disks to the turbine blades by using steam; and the turbine disks are each made from a martensite steel.

According to the present invention, there is also provided a gas turbine for power generation, including a compressor, a combustor, three stages or more turbine blades fixed to turbine disks, and three stages or more turbine nozzles provided in matching with.the turbine blades, characterized in that a gas temperature at the inlet of the first stage turbine nozzle is in a range of 1200 to 1650° C.; the gas turbine has an air cooling line for cooling the first stage turbine nozzle and also cooling the first and second stage turbine disks in a range from shells of the first and second stage turbine disks to the first and second stage turbine blades by using air compressed by the compressor and cooled by a cooler; the gas turbine further has an air cooling line for cooling the second and third stage turbine nozzles by using air; and the turbine disks are each made from a martensite steel.

According to the present invention, there is also provided a gas turbine for power generation, including a compressor, a combustor, three stages or more turbine blades fixed to turbine disks, and three stages or more turbine nozzles provided in matching with the turbine blades, characterized in that a gas temperature at the inlet of the first stage turbine nozzle is in a range of 1200 to 1650° C.; the gas turbine has a steam cooling line for cooling the first stage turbine nozzle and also cooling the first and second stage turbine in a range from shells of the first and second stage turbine disks to the first and second stage turbine blades by using steam; the gas turbine further has an air cooling line for cooling the second and third stage turbine nozzles by using air; and the turbine disks are each made from a martensite steel.

The above-described gas turbine for power generation is preferably configured such that the gas temperature at the inlet of the first stage turbine nozzle is in a range of 1200 to 1295° C.; and the martensite steel contains, on the weight basis, 0.05–0.20% of C, 0.15% or less of Si, 1.0% or less of Mn, 0.50–3.0% of Ni, 8.0–13.0% of Cr, 1.0–4.0% of Mo, 0.10–0.40% of V, and 0.025–0.125% of N.

The gas turbine for power generation is also preferably configured such that the gas temperature at the inlet of the first stage turbine nozzle is in a range of 1300 to 1395° C.; and the martensite steel contains, on the weight basis, 0.05–0.20% of C, 0.15% or less of Si, 1.0% or less of Mn, 0.50–3.0% of Ni, 8.0–13.0% of Cr, 1.0–4.0% of Mo, 0.10–0.40% of V, 0.01–0.20% of Nb, and 0.025–0.125% of N.

The gas turbine for power generation is also preferably configured such that the gas temperature at the inlet of the first stage turbine nozzle is in a range of 1400 to 1650° C.; and the martensite steel contains, on the weight basis, 0.05–0.20% of C; 0.15% or less of Si; 0.20% or less of Mn; 0.5–3.0% of Ni, preferably, 0.50–2.50% of Ni; 8.0–13.0% of Cr, preferably, 10.5–12.5% of Cr; 1.0–4.0% of Mo, preferably, 1.7–2.1% of Mo; 0.10–0.40% of V, preferably, 0.15–0.25% of V; 0.01–0.20% of Nb, preferably, 0.06–0.12% of Nb; 0.025–0.125% of N, preferably, 0.025–0.070% of N; and 1.0–5.0% of Co. When the gas inlet temperature is in the above range of 1400 to 1650° C., the temperature of the first stage turbine disk is increased to about 500° C.; however, the first stage turbine disk, which is made from the above martensite steel, sufficiently withstands such a high temperature. Although the temperature of each of the second and third stage turbine disks is slightly lower than that of the first stage turbine disk, it reaches 450° C. or more.

The martensite steel, used in either of the above three temperature ranges, preferably further contains one kind or more of 0.2–2.0% of W and 0.0005–0.010% of B. The above martensite steel can be used for at least one of a distant piece, a turbine spacer, a final stage compressor disk, a turbine stacking bolt, and a compressor stacking bolt, complying with any one of the above three temperature ranges.

The above-described martensite steel is preferably configured such that the ratio (Mn/Ni) is in a range of 0.11 or less; the content of (Mn+Ni+Co) is in a range of 2.0 to 7.0%; the content of (Mo+0.5W) is in a range of 1.0 to 2.0%; the Cr equivalent expressed by (Cr+6Si+4Mo+1.5W +11V+5 Nb–40C–30N–2Mn–4Ni –2Co) is 8 or less; and the contents of impurities are limited as follows; 0.030% or less of P, 0.010% or less of S, 0.0030% or less of H, and 0.020% or less of O.

According to the present invention, there is also provided a combined power generation system in which a generator is driven by a gas turbine driven by a combustion gas flowing at a high speed, an exhaust gas heat recovery boiler for obtaining steam by using an energy of exhaust gas discharged from the gas turbine, and a high pressure-low pressure integral type steam turbine and a gas turbine, characterized in that the gas turbine is composed of the above-described gas turbine for power generation.

According to the present invention, there is also provided a combined power generation system in which a generator is driven by a high pressure-low pressure integral type steam turbine and a gas turbine, characterized in that a steam temperature at the inlet of a first stage nozzle of the steam turbine and a gas temperature at the inlet of a first stage nozzle of the gas turbine are in a range defined by connecting points A (515° C., 1200° C.), points B (538° C., 1200° C. ), points C (593° C., 1650° C. ), and points D (557° C., 1650° C.) to each other; and the gas turbine includes a compressor; a combustor; three stages or more turbine blades fixed to turbine disks, three stages or more turbine nozzles provided in matching with the turbine blades; an air cooling line for cooling the first stage turbine nozzle and the first and second stage turbine blades by using air compressed by the compressor and cooled by a cooler, or a steam cooling line for cooling the first stage turbine nozzle and the.first and second stage turbine blades by using steam; and an air cooling line for cooling the second and third stage turbine nozzles by using air.

According to the present invention, there is also provided a combined power generation system in which a generator is driven by a high pressure-low pressure integral type steam turbine and a gas turbine, characterized in that a steam temperature at the inlet of a first stage nozzle of the steam turbine and a gas temperature at the inlet of a first stage nozzle of the gas turbine are in a range defined by connecting to each other on a steam temperature/gas temperature diagram points A (515° C., 1200° C.), points B (538° C., 1200° C.), points C (593° C., 1650° C.), and points D (557° C., 1650° C.) to each other; and the gas turbine includes a compressor; a combustor; three stages or more turbine blades fixed to turbine disks, three stages or more turbine nozzles provided in matching with the turbine blades; an air cooling line for cooling the first stage turbine nozzle and the first and second stage turbine blades by using air compressed by the compressor and cooled by a cooler, or a steam cooling line for cooling the first stage turbine nozzle and the first and second stage turbine blades by using steam; and an air cooling line for cooling the second and third stage turbine nozzles by using air.

The above high pressure-low pressure integral type steam turbine is preferably configured such that a value of "blade portion length (inches)×rotational number (rpm)" of the final stage turbine blade is in a range of 120000 or more; and the final stage turbine blade of the steam turbine is made from a martensite steel.

The gas turbine of the present invention is also preferably configured such that at least one of the first stage turbine blade and the first stage turbine nozzle is made from an Ni-based alloy having a single crystal if used at the above gas inlet temperature ranging from 1400 to 1650° C., or is made from an Ni-based alloy having a columnar crystal structure if used at the above gas inlet temperature ranging from 1300 to 1395° C.

The gas turbine of the present invention is also preferably configured such that if used at the above gas inlet temperature ranging from 1400 to 1650° C., the second and third stage turbine blades are each made from a unidirectionally solidified Ni-based alloy having a columnar crystal structure.

The gas turbine of the present invention is also preferably configured such that if used at the above gas inlet temperature ranging from 1400 to 1650° C., the first stage turbine blade and the first stage turbine nozzle are each made from an Ni-based alloy having a single crystal structure;at least one of the second and third stage turbine blades is made from a unidirectionally solidified Ni-based alloy having a columnar crystal structure; and the second and third stage turbine nozzles-are each made from an Ni-based alloy having an equi-axed crystal structure.

(A) Gas Turbine

The martensite steel according to the present invention is used for at least a turbine disk, and can be similarly used for at least one of a distant piece, a turbine spacer, a final stage compressor disk, and a turbine staking bolt. The reason why the content range of each element of the martensite steel is limited will be described below. The content of C is preferably in a range of 0.05% or more for enhancing the tensile strength and yield strength of the martensite steel. However, if the content of C becomes excessively large, the metal structure becomes unstable when the martensite steel is exposed to a high temperature environment for a long time, with a result that the $10^5$ h creep rupture strength of the martensite steel is reduced. Accordingly, the upper limit of the C content is preferably set at 0.20%. The C content is preferably in a range of 0.07 to 0.15%, more preferably, in a range of 0.10 to 0.14%.

The elements Si and Mn are respectively added as a deoxidizer and a deoxidizer/desulfurizer upon melting of steel. The effect of adding Si or Mn can be obtained only by addition of a slight amount thereof. However, since Si is the element of assisting the generation of a δ-ferrite phase, the addition of a large amount of Si accelerates the generation of the δ-ferrite phase which triggers reduction in the fatigue strength and the toughness of the material. Accordingly, the content of Si is preferably in a range of 0.5% or less. If the raw material is melted by a carbon vacuum deoxidizing process and an electro-slag melting process, it is not required to add Si, and it is rather desirable not to add Si. In particular, the Si content is preferably in a range of 0.2% or less to prevent occurrence of embrittlement of the martensite steel. In the case of no addition of Si, the Si content is preferably limited to 0.05% or less.

Mn is the element of accelerating the embrittlement of the martensite steel due to heating, and therefore, the content of Mn is preferably in a range of 0.6% or less. In particular, since Mn is effective as a deoxidizer, it may be added in a range of 0.05 to 0.4%, preferably, 0.05 to 0.25% in consideration of preventing occurrence of embrittlement due to heating. The content of (Si+Mn) is preferably in a range of 0.3% or less from the viewpoint of preventing the embrittlement of the martensite steel.

Cr is effective to enhance the corrosion resistance; and high-temperature strength; however, if Cr is added in an amount of 13% or more, it causes the generation of a δ-ferrite structure. On the other hand, if the content of Cr is less than 8%, the effect of enhancing-the corrosion resistance and high-temperature strength cannot be sufficiently achieved. Accordingly, the Cr content is preferably in a range of 8 to 13%, more preferably, 10.5 to 12.5% from the viewpoint of improvement of the high-temperature strength.

Mo is effective to enhance the creep rupture strength due to the function of reinforcing solid-solution and precipitation and also to prevent occurrence of embrittlement. To ensure a high creep rupture strength, Mo is preferably added in an amount of 1.0% or more; however, if Mo is added in an amount of 4.0% or more, it causes the generation of the δ-ferrite phase. Accordingly, the Mo content is preferably in a range of 1.0 to 4.0%, more preferably, 1.8 to 2.5%. Additionally, in the case where the Ni content is more than 2.1%, the larger the Mo content, the larger the effect of enhancing the creep rupture strength. In particular, such an effect becomes large when the Mo content is in a range of 2.0% or more.

V and Nb are effective to precipitate carbides for enhancing the high-temperature strength and also to improve the toughness. The content of V is preferably in a range of 0.1% or more, and the content of Nb is preferably in a range of 0.01% or more. The addition of V in an amount of 0.4% or more and Nb in an amount of 0.2% or more is undesirable because it causes the generation of the δ-ferrite phase and tends to reduce the creep rupture strength. Accordingly, the V content is preferably in a range of 0.15 to 0.25%, and the Nb content is preferably in a range of 0.04 to 0.10%. Ta may be added in place of Nb or in combination with Nb.

Ni is effective to enhance the toughness after the material is heated at a high temperature for a long time, and to prevent the generation of the δ-ferrite phase. To achieve the above effect, the content of Ni is preferably in a range of 0.5% or more; however, the addition of Ni in an amount of more than 3% is undesirable because it reduces the long-period creep rupture strength. Accordingly, the content of Ni is preferably in a range of 2.0 to 3.0%, more preferably, 2.5 to 3.0%.

Although Ni is effective to prevent the embrittlement of the material due to heating, Mn tends to exert adverse effect. Accordingly, from the viewpoint of embrittlement due to heating, there is a close relationship between Ni and Mn. By setting the ratio (Mn/Ni) at 0.11 or less, it is possible to significantly prevent the embrittlement due to heating. In particular, the ratio (Mn/Ni) is, preferably, in a range of 0.10 or less, more preferably, 0.04 to 0.10.

N is effective to improve the creep rupture strength and to prevent the generation of the δ-ferrite phase. The content of N is preferably in a range of 0.025% or more; however, if N is added in an amount of more than 0.125%, it reduces the toughness. In particular, to obtain excellent characteristics, the content of N is preferably in a range of 0.03 to 0.08%.

Co is effective to enhance the high-temperature strength. To improve the high-temperature characteristics of the material, it is desirable to increase the content of Co. Concretely, Co is preferably added in an amount of 1.0 to 5.0%.

Like the above-described element Mo, W contributes to the reinforcement of the material. The content of W is preferably in a range of 0.2 to 2.0%. B has an effect of significantly reinforcing the material. The content of B is preferably in a range of 0.0005 to 0.01%. Further, by adding 0.3% or less of Al, 0.5% or less of Ti, 0.1% or less of Zr, 0.1% or less of Hf, 0.01% or less of Ca, 0.01% or less of Mg, 0.01% or less of Y, 0.01% or less of a rare earth element, and 0.5% or less of Cu, the high-temperature strength of the martensite steel can be improved.

The heat-treatment of the steel of the present invention is preferably performed by uniformly heating the steel material at a temperature ranging from 900 to 1150° C. to transform the metal structure into an austenite structure, rapidly cooling the material at a cooling rate of 100° C./h or more to transform the austenite structure to a martensite structure, heating and keeping the material to and at a temperature ranging from 450 to 600° C. (primary tempering), and heating and keeping the material to and at a temperature ranging from 550 to 650° C. (secondary tempering). The quenching temperature is preferably set at a temperature right over the Ms point, for example, 150° C. or more, for preventing occurrence of quenching cracks. The quenching is preferably performed by an oil quenching or water atomization quenching method. The primary tempering is performed by heating the material from the quenching temperature to a temperature ranging from 450 to 600° C.

With respect to multi-stage compressor disks, at least the final stage disk or all of the disks can be made from the above heat resisting steel. Alternatively, the disks, disposed on the upstream side (low gas temperature side) from the first stage disk to an intermediate stage disk, can be made from a low alloy steel, and the disks on the downstream side from the intermediate stage disk to the final stage disk can be made from the above heat resisting steel. The disks on the upstream side from the first stage disk to the intermediate stage disk may be made from an Ni—Cr—Mo—V steel which contains, on the weight basis, 0.15–0.30% of C, 0.5% or less of Si, 0.6% or less of Mn, 1–2% of Cr, 2.0–4.0% of Ni, 0.5–1% of Mo, and 0.05–0.2% of V, the balance being substantially Fe, and which exhibits the tensile strength at room temperature in a range of 80 kg/mm$^2$ or more and the V-notch Charpy impact value at room temperature in a range of 20 kg-m/cm$^2$ or more. The disks on the downstream side from the intermediate stage disk, excluding at least the final stage disk, may be made from a Cr—Mo—V steel which contains, on the weight basis, 0.2–0.4% of C, 0.1–0.5% of Si, 0.5–1.5% of Mn, 0.5–1.5% of Cr, 0.5% or less of Ni, 1.0–2.0% of Mo, and 0.1–0.3% of V, the balance being substantially Fe, and which exhibits the tensile strength at room temperature in a range of 80 kg/mm$^2$ or more, the elongation percentage in a range of 18% or more, and the percentage of reduction of area in a range of 50% or more.

A compressor stub shaft can be made from an Ni—Cr—Mo—V steel containing, on the weight basis, 0.15–0.3% of C, 0.5% or less of Si, 0.6% or less of Mn, 2–4% of Ni, 1–2% of Cr, 0.5–1% of Mo, and 0.05–0.2% of V. A turbine stub shaft can be made from a Cr—Mo—V steel containing, on the weight basis, 0.2–0.4% of C, 0.1–0.5% of Si, 0.5–1.5% of Mn, 0.5–1.5% of Cr, 0.5% or less of Ni, 1–2% of Mo, and 0.1–0.3% of V.

In the case of compressor disks comprising seventeen stages, the disks in the first to twelfth stages can be each made from the above-described Ni—Cr—Mo—V steel; the disks in the thirteenth to sixteenth stages can be each made from the Cr—Mo—V steel; and the disk in the seventeenth stage can be made from the above-described martensite steel.

The first and final compressor disks have structures that the disk next to the first stage compressor disk has a rigidity and the disk immediately preceding to the final stage compressor disk has a rigidity. These disks are also configured such that the thickness of each disk becomes smaller in the direction from the first stage to the final stage.

The blades and nozzles of the compressor are each preferably made from a martensite steel containing 0.05–0.2% of C, 0.5% or less of Si, 1% or less of Mn, 10–13% of Cr or 0.5% or less of Mo, and 0.5% or less of Ni, the balance being Fe.

With respect to shrouds each of which is brought into slide-contact with the tip of the turbine blade and is formed into a ring-shape, the first stage shroud can be made from a cast alloy containing, on the weight basis, 0.05–0.2% of C, 12% or less of Si, 2% or less of Mn, 17–27% of Cr, 5% or less of Co, 5–15% of Mo, 10–30% of Fe, 5% or less of W, and 0.02% or less of B, the balance being substantially Ni; and the remaining shrouds can be each made from a cast alloy containing, on the weight basis, 0.3–0.6% of C, 2% or less of Si, 2% or less of Mn, 20–27% of Cr, 20–30% or less of Ni, 0.1–0.5% of Nb, and 0.1–0.5% of Ti, the balance being substantially Fe. Such a shroud is composed of a plurality of blocks formed into the ring-shape.

With respect to the diaphragms for fixing the turbine nozzles, the first stage turbine nozzle can be made from an alloy containing, on the weight basis, 0.05% or less of C, 1% or less of Si, 2% or less of Mn, 16–22% of Cr, and 8–15% of Ni, the balance being substantially Fe; and the remaining turbine nozzle portion can be each made from a high C-high Ni steel casting.

A plurality of combustors are arranged around the turbine. Each combustor has a double structure of an outer cylinder and an inner cylinder. The inner cylinder can be made from an alloy containing, on the weight basis, 0.05 to 0.2% of C, 2% or less of Si, 2% or less of Mn, 20–25% of Cr, 0.5–5% of Co, 5–15% of Mo, 10–30% of Fe, 5% or less of W, and 0.02% or less of B, the balance being substantially Ni. The inner cylinder is obtained by bending a plate (thickness: 2–5 mm) and welding both ends of the plate, and crescent louver holes for supplying air are formed over the periphery of the cylinder. The material is subjected to solution treatment to have an austenite structure.

A turbine blade used for a condition in which the combustion gas temperature at the inlet of a turbine nozzle is in a range of 1200 to 1295° C. can be made from an ordinary cast alloy which contains, on the weight basis, one or more kinds of 0.07–0.25% of C, 1% or less of Si, 1% or less Mn, 12–20% of Cr, 5–15% of Co, 1.0–5.0% of Mo, 1.0–5.0% of W, 0.005–0.03% of B, 2.0–7.0% of Ti, 3.0–7.0% of Al, 1.5% or less of Nb, 0.01–0.5% of Zr, and 0.01–0.5% of Hf, 0.01–0.5% of V, the balance being substantially Ni, and which has a structure in which a γ'-phase and a γ"-phase are precipitated in an austenite phase matrix. A turbine nozzle can be made from a cast alloy which contains, on the weight basis, 0.20–0.60% of C, 2% or less of Si, 2% or less of Mn, 25–35% of Cr, 5–15% of Ni, 3–10% of W, and 0.003–0.03% of B, the balance being substantially Co, and further contains, if needed, at least one kind of 0.1–0.3% of Ti, 0.1–0.5% of Nb, and 0.1–0.3% of Zr, and which has a structure in which eutectic carbides and secondary carbides are precipitated in an austenite phase matrix. These alloys are each subjected to solution treatment and aging treatment to form the above-described precipitates for reinforcing the structure.

To prevent corrosion due to high temperature combustion gas, the turbine blade can be covered with a diffusion coating of Al, Cr, or (Al+Cr). The thickness of the coating layer is preferably in a range of 30 to 150 $\mu$m. The coating layer is preferably formed on a blade portion being in contact with gas.

For the 1300° C.-class gas turbine for power generation and the next generation 1500° C.-class gas turbine for power generation, the metal temperature of the first stage turbine blade reaches up to 700° C. or more and further sometimes reaches up to 900° C. or more even in the consideration of the cooling technique. Accordingly, the material used for such a first stage blade is required to exhibit a useful temperature higher than the metal temperature by 20° C. or more under a service condition of $10^5$ h×14 kgf/mm². The temperature of the gas impinged on each of the blades in the second and later stages is lower than that impinged on the first stage blade by a -temperature ranging from 50 to 100° C.; however, the metal temperature of each of the second and later stage blades becomes higher as compared with the gas turbine of the class having the combustion temperature of 1300° C. Accordingly, the material used for each of the second and later stage blades is required to exhibit a useful temperature of 600° C. or more, and further, 800° C. or more under a service condition of $10^5$ h×14 kgf/mm². If each blade is made from a material having a strength lower than that described above, the blade may be highly likely broken during operation, and it fails to sufficiently convert the energy of the gas flow into a rotating force, thereby reducing the efficiency.

The first stage nozzle, which initially receives combustion gas, is most frequently exposed to high temperature, and is subjected to significant thermal stress and thermal impact due to repetition of start-up and interruption of the gas turbine. For the gas turbines of the classes having the combustion gas temperatures of 1300° C. and 1500° C., the first stage nozzle may be made from an alloy having a useful temperature ranging from 700° C. or more, and further 900° C. or more under a service condition of $10^5$ h×6 kgf/mm² even in consideration of the cooling ability. Each of the second and later stage nozzles is not severed in terms of temperature as compared with the first stage nozzle; however, since the metal temperature of each of the second and later stage nozzles becomes higher as compared with the gas turbine of the class having the combustion temperature of 1300° C., each of the second and later stage nozzles may be made from a material having a useful temperature ranging from 600° C. or more, and further 800° C. or more under a service condition of $10^5$ h×14 kgf/mm².

According to the present invention, the turbine blades and turbine nozzles operated at the gas temperature at the inlet of the first stage turbine nozzle ranging from 1400 to 1650° C., preferably, 1500 to 1650° C. are preferably configured such that the first stage turbine blade and the first stage nozzle are each made from an Ni-based alloy having a single crystal structure and are each covered with a thermal insulation coating layer; the second stage turbine blade and the second stage turbine nozzle are each covered with an alloy coating layer; the Ni-based alloy having the single crystal structure contains, on the weight basis, 6–8% of Cr, 0.5–1% of Mo, 6–8% of W, 1–4% of Re, 4–6% of Al, 6–9% of Ta, 0.5–10% of Co, and 0.03–0.13% of Hf; and the Ni-based alloy having the single crystal structure further contains 0.1–2% of Ti and/or Nb. According to the present invention, the first stage blade and the first stage nozzle operated at the above gas temperature ranging from 1400 to 1495° C. and the second turbine blade operated at the above gas temperature of 1500° C. or more is preferably made from an Ni-based alloy having a columnar crystal structure containing, on the weight basis, 5–18% of Cr, 0.3–5% of Mo, 2–10% of W, 2.5–6% of Al, 0.5–5% of Ti, 0.05–0.21% of C, and 0.005–0.025% of B, and more preferably made from a unidirectionally solidified Ni-based alloy having a columnar crystal structure containing, in addition to the composition of the above Ni-based alloy, at least one kind of 1–4% of Ta, 10% or less of Co, 0.03–0.2% of Hf, 0.001–0.05% of Zr, 0.1–5% of Re, and 0.1–3% of Nb. In particular, the above Ni-alloy can be also used for the second, third or.fourth blades.

The second and third stage turbine nozzles are each preferably made from a Ni-based alloy having a polycrystalline structure containing, on the weight basis, 21–24% of Cr, 18–23% of Co, 0.05–0.20% of C, 1–8% of W, 1–2% of Al, 2–3% of Ti, 0.5–1.5% of Ta, and 0.05–0.15% of B.

To improve the heat efficiency of the gas turbine, as described above, it is most effective to increase the combustion gas temperature. If the metal temperature of the first stage turbine blade is set at a temperature of 920° C. or more by making use of the high cooling technique for the blades and nozzles in combination of the heat insulation coating technique, the gas temperature at the inlet of the first stage turbine nozzle can be increased to a temperature ranging from 1450 to 1550° C. This makes it possible to increase the power generation efficiency of the gas turbine 37% up or more. It should be noted that the power generation efficiency is expressed in LHV system. If the above gas turbine is operated in combination of the steam turbine as a combined power generation system further configured such that the turbine exhaust gas temperature is in a range of 590 to 650° C., it is possible to provide a highly efficient combined power generation system capable of increasing the total power generation efficiency to 50% up or more, preferably, 55% up or more.

According to the present invention, it is possible to provide a gas turbine operated at a higher temperature, which is improved to increase the efficiency to 37% up or more in LHV at the turbine inlet temperature ranging from 1500 to 1650° C.

(B) High pressure-Low pressure Integral Type Steam Turbine (1) Long-blade Material A long-blade material according to the present invention, which is made from a martensite based stainless steel containing 8–13 wt % of Cr, is preferably used for a final stage blade (rotating blade, the length of the blade portion: 30 inches or more, preferably, 40 inches or more, more preferably, 43 inches or more) of a high pressure-low pressure or high pressure-intermediate pressure-low pressure integral type steam turbine for 50 cycle power generation.

Further, the above martensite based stainless steel of the present invention is preferably used for a final stage blade (the length of the blade portion: 30 inches or more, preferably, 33 inches or more, more preferably, 35 inches or more) of a high pressure-low pressure or high pressure-intermediate pressure-low pressure integral type steam turbine for 60 cycle power generation.

The above martensite based stainless steel contains, on the weight basis, 0.08–0.18% of C, 0.25% or less of Si, 1.00% or less of Mn, 8.0–13.0% of Cr, 1.5–3% (preferably, more than 2.1 to 3% or less) of Ni, 1.5–3.0% of Mo, 0.05–0.35% of V, 0.02–0.20% of Nb and/or Ta in total, and 0.02–0.10% of N.

According to the high pressure-intermediate pressure-low pressure or high pressure-low pressure integral type steam turbine is preferably configured by mounting the above-described long-blades having a tensile strength of 120 kg/mm$^2$ or more on a rotor shaft made from the martensite based heat-resisting steel which contains, on the weight basis, 0.18–0.28% of C, 0.1% or less of Si, 0.1–0.3% of Mn, 1.5–2.5% of Cr, 1.5–2.5% of Ni, 1–2% of Mo, and 0.1–0.35% of V, and which has structural properties in which the 10$^5$ h polished and notching creep rupture strengths (at 538° C.) at the high pressure portion are 13 kg/mm$^2$ or more; the tensile strength at the low pressure portion is 84 kg/mm$^2$ or more; and the fracture surface transient temperature is 35° C.

An erosion preventive layer is preferably provided on the leading edge portion of the final stage blade. The concrete length of the blade is represented by 33.5", 40", and 46.5". The erosion preventive layer is made from a Co-based alloy containing, on the weight basis, 0.5–1.5% of C, 1.0% or less of Si, 1.0% or less of Mn, 25–30% of Cr, and 2.5–6.0% of W.

The long-blade of the steam turbine is required to have a high tensile strength and a high cycle fatigue strength for withstanding a high centrifugal strength and vibration stress caused by high speed rotation. From this viewpoint, since the fatigue strength of the blade material is significantly reduced if a harmful δ-ferrite phase is present in the metal structure of the blade material, the blade material must have such a composition as to exhibit a full-temper martensite structure.

The composition of the steel of the present invention is preferably adjusted such that the Cr equivalent calculated on the basis of the above-described equation becomes 10 or less so as to prevent the δ-ferrite phase from being substantially present in the metal structure of the steel.

The tensile strength of the long-blade material may be in a range of 120 kg/mm$^2$ or more, preferably, 128 kgf/mm$^2$ or more, more preferably, 128.5 kgf/mm$^2$. The proof stress of the long-blade material may be in a range of 80 kg/mm$^2$ or-more, preferably, 88 kg/mm$^2$ or more. The elongation percentage is preferably in a range of 10% or more in the length direction and 5% or more in the peripheral direction, and the impact value thereof is preferably in a range of 3.45 kgf-m or more.

To obtain a homogeneous, high strength long-blade material for the steam turbine, the raw material is preferably subjected to refining heat-treatment. The heat-treatment is performed by heating the material having been produced by melting and forged to a temperature ranging from 1000 to 1100° C. (preferably, 1000–1070° C.) and keeping the material at that temperature, preferably, for 0.5–3 hr;

quenching (preferably, oil-quenching) the material by rapidly cooling the material to room temperature; and tempering the material at a temperature ranging from 550 to 620° C. Here, the tempering is preferably repeated twice or more. For example, a primary tempering is performed by heating the material at a temperature ranging from 550–570° C., keeping the material at that temperature, preferably, for 1–6 hr, and cooling the material to room temperature;. and then a secondary tempering is performed by heating the material at a temperature ranging from 560–590° C., keeping the material at that temperature, preferably, for 1–6 hr. and cooling the material to room temperature. The secondary tempering temperature is preferably set to be higher than the primary tempering temperature, preferably, by a temperature ranging from 10 to 30° C., more preferably, 15 to 20° C.

A final stage blade portion of the low pressure turbine according to the present invention, having the length of 914 mm (36") or more, preferably, 965 mm (38") or more, is applied to a 3600 rpm steam turbine for 60 cycle power generation, and a final stage blade portion of the low pressure turbine according to the present invention, having the length of 1041 mm (41") or more, preferably, 1092 mm (43") or more, more preferably, 1168 mm (46") or more), is applied to a 3000 rpm steam turbine for 50 cycle power generation. In this case, the value of "blade portion length (inch)×rotational speed (rpm)" becomes 125,000 or more, preferably, 138,000 or more.

With respect to the long-blade material of the present invention, to adjust the alloy composition for obtaining a full martensite structure thereby ensuring a high strength, a high low-temperature toughness, and a high fatigue strength, the Cr equivalent calculated in accordance with the following equation.(the content of each element is expressed in wt %) is adjusted in a range of 4 to 10.

Cr equivalent=Cr+6Si+4Mo+1.5W+11V+5 Nb−40C−30N−30B−2Mn−4Ni−2Co+2.5 Ta.

The content of C is preferably in range of 0.08% or more for obtaining a high tensile strength, and is preferably in a range of 0.2% or less for preventing the reduction of the toughness. In particular, the C content is preferably in a range of 0.10–0.18%, more preferably, 0.12–0.16%.

The elements Si and Mn are respectively added as a deoxidizer and a deoxidizer/desulfurizer upon melting of steel. The effect of adding Si or Mn can be obtained only by addition of a slight amount thereof. However, since Si is the element of assisting the generation of a δ-ferrite phase, the addition of a large amount of Si accelerates the generation of the δ-ferrite phase which exerts adverse effect in reducing the fatigue strength and the toughness of the material. Accordingly, the content of Si is preferably in a range of 0.25% or less. If the raw material is melted by a carbon vacuum deoxidizing process or an electro-slag melting process, it is not required to add Si, and it is rather desirable not to added Si. In particular, the Si content is preferably in a range of 0.10% or less, more preferably, 0.07% or less.

The addition of Mn in an amount of 0.9% or less is effective to improve the toughness. In particular, since Mn is effective as a deoxidizer, it may be added in a range of 0.6% or less, preferably, 0.1 to 0.5%, more preferably, 0.2–0.4% for improving the toughness.

Cr is effective to enhance the corrosion resistance and high-temperature strength; however, if Cr is added in an amount of more than 13%, it causes the generation of a δ-ferrite structure. On the other, if the content of Cr is less than 8%, the effect of enhancing the corrosion resistance and high-temperature strength cannot be sufficiently achieved. Accordingly, the Cr content is preferably in a range of 8 to 13%. In particular, the Cr content is preferably, in a range of 10.5–12.5%, more preferably, 11 to 12% from the viewpoint of improvement of the strength.

Mo is effective to enhance the tensile strength due to its function of reinforcing solid-solution and precipitation. Mo does not exhibit sufficient effect in improvement of the tensile strength and if Mo is added in an amount of more than 3% or more, it causes the generation of the δ-ferrite phase. Accordingly, the Mo content may be in a range of 1.5 to 3.0%, preferably, 1.8 to 2.7%, more preferably, 2.0–2.5%. In addition, W and Co each exhibit the same effect as that of Mo.

V and Nb are effective to precipitate carbides for enhancing the tensile strength and also to improve the toughness. The addition of V in an amount of 0.05% or less and Nb in an amount of 0.02% or less cannot sufficiently achieve the additional effect. The addition of V in an amount of 0.40% or more and Nb in an amount of 0.2% or more is undesirable because it causes the generation of the δ-ferrite phase. Accordingly, the V content is preferably in a range of 0.20 to 0.36%, more preferably, 0.25–0.31% and the Nb content is preferably in a range of 0.04 to 0.16%, more preferably, 0.06–0.14%. Ta may be added in place of Nb or in combination of Nb.

The addition of Ni in an amount of 2–3% is effective to enhance the low-temperature toughness, and to prevent the generation of the δ-ferrite phase. In particular, the Ni content is preferably in a range of 2.3 to 2.9%, more preferably, 2.4 to 2.8%.

The addition of N in an amount of 0.02–0.1% is effective to enhance the toughness and tensile strength, and to prevent the generation of the δ-ferrite phase. In particular, the N content is preferably in a range of 0.04 to 0.08%, more preferably, 0.045 to 0.08.

The reduction of Si, P and S is effective to enhance the low-temperature toughness without harming the tensile strength. Accordingly, it may be desirable to make the contents of Si, P and S as small as possible. To enhance the low-temperature toughness, the Si content is preferably in a range of 0.1% or less, more preferably, 0.05% or less; the P content is preferably in a range of 0.015% or less, more preferably, 0.010% or less; and the S content is preferably in a range of 0.015% or less, more preferably, 0.010% or less. The reduction of Sb, Sn and As is also effective to enhance the low-temperature toughness, and accordingly, it may be desirable to make the contents of Sb, Sn and As as small as possible. However, in consideration of the current steel-production technology, the content of Sb is limited to 0.0015% or less, preferably, 0.001% or less; the content of Sn is limited to 0.01% or less, preferably, 0.005% or less, and the content of As is limited to 0.02% or less, preferably, 0.01% or less.

Further, according to the present invention, the ratio Mn/Ni is preferably in a range of 0.11 or less.

The material of the present invention may desirably have a full-temper martensite structure by heat-treatment. The heat-treatment is performed by uniformly heating the material at a temperature ranging from 1000 to 1100° C. to entirely transform the metal structure to an austenite structure; rapidly cooling (preferably oil-cooling) the material; heating and keeping the material to and at a temperature ranging from 550 to 570° C. and cooling the material (primary tempering); and heating and keeping the material to and at a temperature ranging from 560 to 680° C. and cooling the material (secondary tempering).

(2) Rotor Shaft for High Pressure-Low Pressure or High Pressure-Intermediate Pressure-Low Pressure Integral Type Steam Turbine C is an element necessary for improving the hardenability and ensuring the toughness and strength with the content of 0.15%–0.4%. The content of C is preferably in a range of 0.20–0.28%.

Si and Mn have been added as a deoxidizer; however, according to the steel-production technology such as the vacuum carbon deoxidation process or electro-slag re-melting process, a good quality rotor can be produced by melting without addition of Si and Mn. To prevent embrittlement of the material caused after long-term use, the contents of Si and Mn should be reduced. The Si content may be in a range of 0.1% or less, preferably, 0.05% or less, more preferably, 0.01% or less, and the Mn content may be in a range of 0.5% or less, preferably, 0.05–0.25%, more preferably, 0.20% or less.

The addition of Mn in a trace amount is effective to fix an harmful element S, which degrades hot workability, as a sulfide MnS, that is, has an effect of reducing the adverse effect of S. Accordingly, in production of a large-sized forged product, such as a rotor shaft for the steam turbine, it may be desirable to add Mn in an mount of 0.01% or more. However, if the content of S can be reduced by the steel-production technology such as super-cleaning technology for reducing the contents of S and P, since the addition of Mn reduces the toughness and high-temperature strength, the content of Mn may be reduced to zero, if possible. In this embodiment, the Mn content is preferably in a range of 0.01 to 0.2%.

The addition of Ni in an amount of 1.5–2.7% is effective to improve the hardenability, creep rupture strength, and toughness. In particular, the Ni content is preferably in a range of 1.6 to 2.0%, more preferably, 1.7 to 1.9%. Further, to obtain the high-temperature strength in combination of the toughness, the Ni content may be set to be larger than the Cr content up to 0.20% or to be lower than the Cr content by 0.30% or less.

The addition of Cr in an amount of 1.5 to 2.5% is effective to improve the hardenability, toughness, and creep rupture strength, and to improve the corrosion resistance in steam. In particular, the Cr content is preferably in a range of 1.7 to 2.3%, more preferably, 1.9 to 2.1%.

The addition of Mo in an amount of 0.8 to 2.5% is effective to precipitate fine carbide particles in crystal grains during tempering and hence to improve the high-temperature strength and prevent the embrittlement due to tempering. From the viewpoint of improvement of the strength and toughness, the Mo content is preferably in a range of 1.0 to 1.5%, more preferably, 1.1 to 1.3%.

The addition of V in an amount of 0.15 to 0.35% is effective to precipitate fine carbide particles in crystal grains during tempering and hence to improve the high-temperature strength and toughness. In particular, the V content is preferably in a range of 0.20 to 0.30%, more preferably, more than 0.25% and not more than 0.30%.

Further, by adding any one of a rare earth element, Ca, Zr, and Al in producing the low alloy having the above composition by melting, the toughness can be improved. The content of the rare earth element is preferably in a range of 0.05 to 0.4%; the Ca content is preferably in a range of 0.0005 to 0.01%; the Zr content is preferably in a range of 0.01 to 0.2%; and the Al content is preferably in a range of 0.001 to 0.02%.

Oxygen exerts an effect on the high-temperature strength. According to the steel of the present invention, by controlling the content of $O_2$ in a range of 5 to 25 ppm, it is possible to increase the creep rupture strength.

At least one of Nb and Ta is preferably added in an amount of 0.005 to 0.15%. If the total content of Nb and Ta is less than 0.005%, the effect to increase the strength cannot be-sufficiently achieved, while if it is more than 0.15%, for a large-sized structure such as a rotor shaft for the steam turbine, large carbides thereof are precipitated to reduce the strength and toughness. For this reason, the content of at least Nb and Ta is preferably in a range of 0.005 to 0.15%, more preferably, 0.01 to 0.05%.

The addition of W in an amount of 0.1% or more is desirable for enhancing the strength. However, if the W content is more than 1.0%, for a large-sized ingot, the strength is reduced due to segregation. Accordingly, the W content is preferably in a range of 0.1 to 1.0%, more preferably, 0.1 to 0.5%.

The ratio Mn/Ni is preferably in a range of 0.13 or less, or the ratio (Si+Mn)/Ni is preferably in a range of 0.18 or less. This limitation of ratio is effective to significantly prevent the embrittlement due to heating of an Ni—Cr—Mo—V low alloy steel having a bainite structure usable for the high pressure-low pressure or high pressure-intermediate pressure-low pressure integral type rotor shaft. Further, by setting the ratio Ni/Mo in a range of 1.25 or more and the ratio Cr/Mo in a range of 1.1 or more, or setting the ratio Cr/Mo in a range of 1.45 or more and the ratio Cr/Mo in a range of a value defined by $[-1.11 \times (Ni/Mo)+2.78]$ or more, there can be obtained an advantage of achieving high strength in which the material heat-treated entirely under the same condition exhibits $10^5$ h creep rupture strength (at 538° C.) of 12 kg/mm$^2$ or more.

Also, by setting the Ni content at a specific ratio to the Cr content, it is possible to ensure a higher strength on the high pressure side and to ensure a strength together with a higher toughness on the low pressure side.

The material used for the rotor shaft for the high pressure-low pressure or high pressure-intermediate pressure-low pressure integral type steam turbine of the present invention is preferably configured such that, at the high pressure portion or high pressure-intermediate pressure portion, the $10^5$ h polished and notching creep rupture strengths (at 538° C.) are each in a range of 13 kg/mm$^2$ or more; and at the low pressure portion or intermediate pressure-low pressure portion, the tensile strength is in a range of 84 kg/mm$^2$ or more and the fracture surface transient temperature is in a range 35° C. or less. To obtain such excellent mechanical properties, the material is preferably subjected to tilting refining heat-treatment as follows. To make fine the metal structure, the material is preferably subjected to pearite treatment performed by keeping the material at a temperature ranging from 650 to 710° C. for 70 hr or more prior to the refining heat-treatment.

* high pressure portion or high pressure-intermediate pressure portion of the rotor shaft: obtaining a large high-temperature strength ○ quenching: heating and keeping the material to and at 930–970° C. and then cooling it ○ tempering: heating and keeping the material to and at 570–670° C. and then slowly cooling it (tempering is preferably repeated twice, and one tempering is preferably performed by heating and keeping the material to and at 650–670° C.)

* low pressure portion or intermediate pressure-low pressure portion of the rotor shaft: obtaining a large tensile strength and low-temperature toughness ○ quenching: heating and keeping the material to and at 880–910° C. and then rapidly cooling it ○ tempering: heating and keeping the material to and at 570–640° C. and then slowly cooling it (tempering is preferably repeated twice, and one tempering is preferably performed by heating and keeping the material to and at 615–635° C.)

To be more specific, the material on the high pressure side is preferably quenched at a quenching temperature higher than that of the material on the low pressure side, to make the high-temperature strength higher than that of the material on the low pressure side, thereby obtaining a creep rupture time of 180 hr or more at 550° C. and 30 kg/mm$^2$ on the high pressure side; and the material on the low pressure side is preferably subjected to tilting heat-treatment such that the transient temperature at the center hole on the lower pressure side is lower than the high pressure side by 10° C. or less. The tempering temperature of the material on the high pressure side is preferably set to be higher than that of the material on the low pressure side.

In the high pressure-low pressure integral type rotor shaft of the present invention, which is made from the above-described steel having a high creep rupture strength together with a high impact value, the final stage rotating blade (blade) having the length of 40 inches or more, preferably, 43 inches or more for 50 cycle power generation and 33 inches or more, preferably, 35 inches or more for 60 cycle power generation is preferably planted.

(3) Other Rotating Blades (Blades), Stationary Blades (Nozzles) and Others for Steam Turbine of the Present Invention For the high pressure side blades, the first stage blade, or each of first, second and third stage blades is preferably made from a martensite steel containing, on the weight basis, 0.2 to 0.3% of C, 0.5% or less of Si, 1% or less of Mn, 10–13% of Cr, 0.5% or less of Ni, 0.5–1.5% of Mo, 0.5–1.5% of W, and 0.15–0.35% of V. For the low pressure side blades each having the length of 26 inches or less, each blade is preferably made from a martensite steel containing, on the weight basis, 0.05–0.15% of C, 0.5% or less of Si, 1% or less, preferably, 0.2–1.0% of Mn, 10–13% of Cr, 0.5% or less of Ni, and 0.5% or less of Mo.

The stationary blade (nozzle) of the present invention is preferably made from a tempering full-martensite steel containing, on the weight basis, 0.05–0.15% of C, 0.5% or less of Si, 0.2–1% of Mn, 10–13% of Cr, 0.5% or less of Ni, and 0.5% or less of Mo.

The casing of the present invention is preferably made from a Cr—Mo—V cast steel having a bainite structure containing, on the weight basis, 0.10–0.20% of C, 0.75% or less of Si, 1% or less of Mn, 1–2% of Cr, 0.5–1.5% of Mo, 0.05–0.2% of V, and 0.05% or less of Ti.

BEST MODE FOR CARRYING OUT THE INVENTION

First Embodiment

Figure 1:
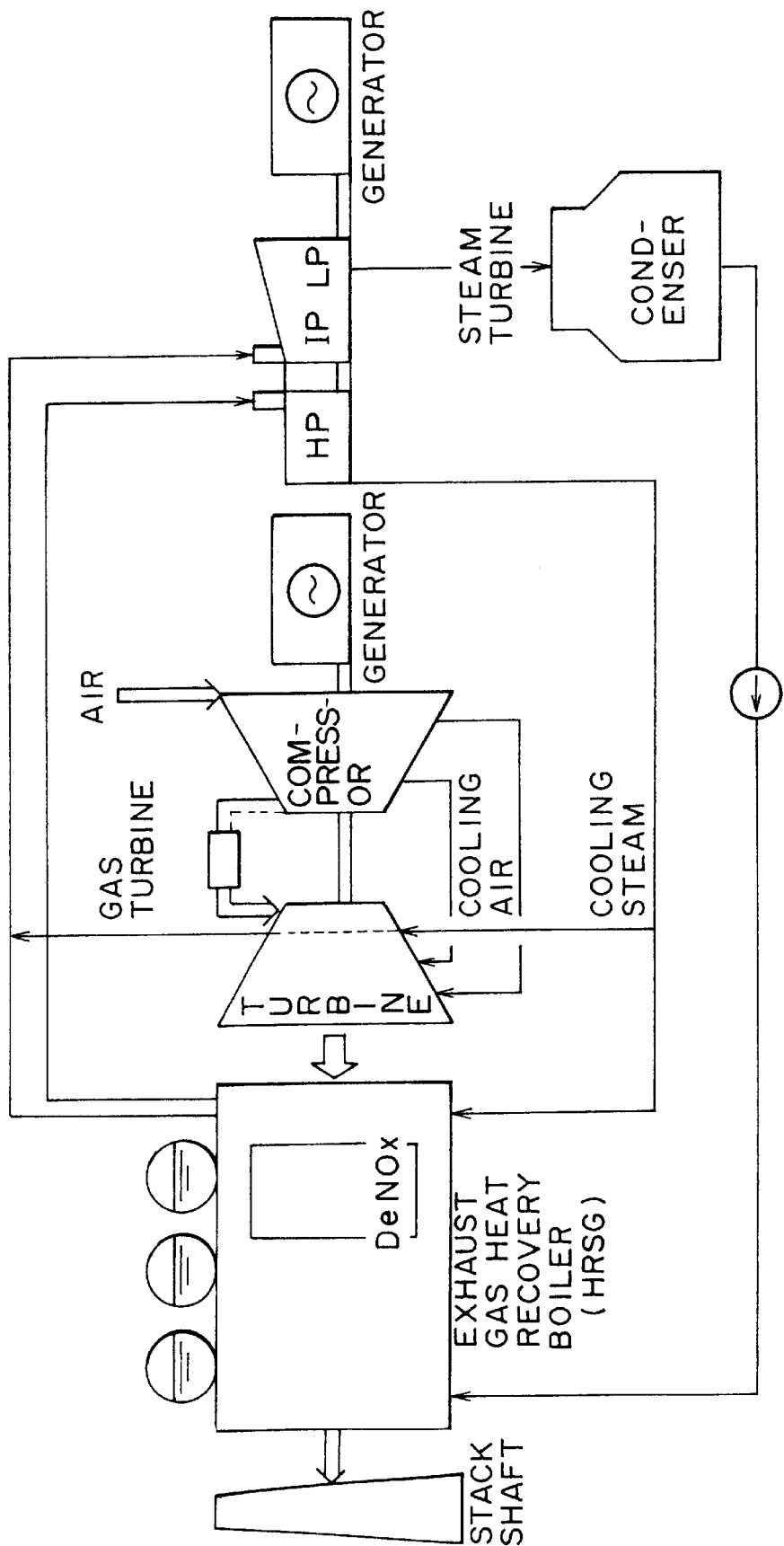
FIG. 1 is a view showing configuration of a combined power generation system by steam cooling.

FIG. 1 is a view showing a cycle of a combined power generation system in which first and second stage rotating blades (blades) and a first stage stationary blade (nozzle) are cooled with steam, and second and third stage stationary blade (nozzles) are cooled with air. The combined power generation system configured to generate an electric power by combination of a steam turbine and a gas turbine can utilize steam generated by an exhaust gas heat recovery boiler, or steam generated by a separate means.

A. Gas Turbine

Figure 2:
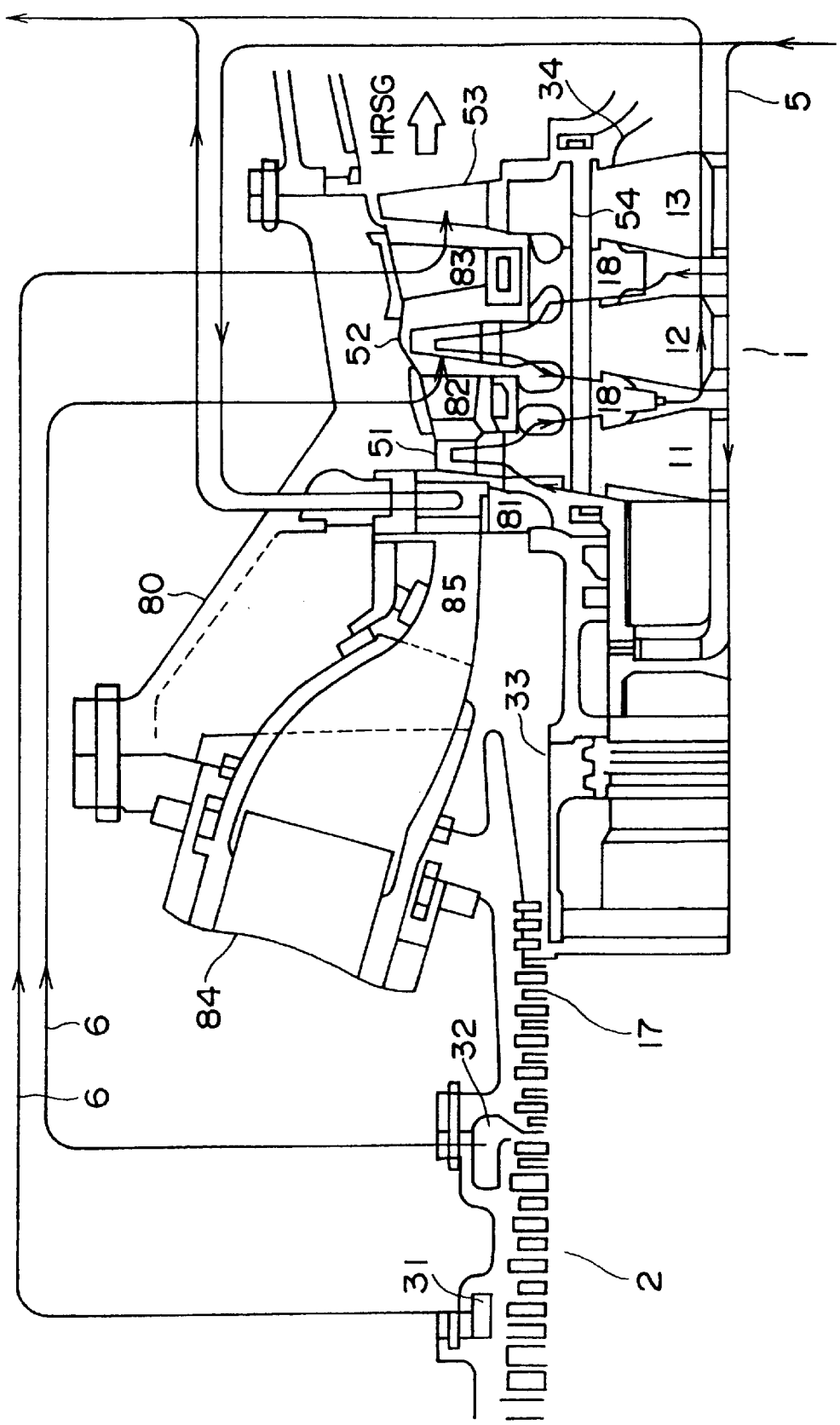
FIG. 2 is a sectional view of a rotating portion of a gas turbine by steam cooling.

FIG. 2 is a sectional view showing an upper half portion of a gas turbine having three stage blades, adopting a closed steam cooling system. Steam flows in a cooling passage 5 shown by an arrow in FIG. 2. To be more specific, steam passing through the inner central portion of a turbine rotor 1 enters the first and second blades 51 and 52 through gaps between disks and spacers, cooling respective blades, and returns to a steam inlet of the turbine rotor 1 through the gaps between the disks and spaces and flows out from the periphery of the steam inlet of the turbine rotor 1. For cooling the first stage nozzle, the steam also passes through a casing 80, cooling a first stage nozzle 81, and returns through the casing 80 along the same route and flows out of the turbine rotor 1.

On the other hand, air for cooling second and third stage nozzles, which-is extracted from extracting portions 31 and 32 of an air compressor, flows in two cooling passages 6 shown by arrows in FIG. 2. The air extracted from the extracting portion 31, which is slightly low in compression ratio, is used for cooling the third stage nozzle. The air extracted from the extracting portion 32, which is slightly higher in compression ratio, that is, slightly larger in cooling ability than the air extracted from the extracting portion 31, is used for cooling the second stage nozzle.

As shown in FIG. 2, the gas turbine in this embodiment includes the casing 80, the compressor having a compressor rotor 2 and a blade row provided on the outer periphery of the compressor rotor 2, a combustor 84, a gas path 85 in which the nozzles 81 to 83 and the blades 51 to 53 are alternately arranged, and the turbine rotor 1.

The turbine rotor 1 includes three turbine disks 11, 12 and 13 and a stub shaft 34, which are closely connected to each other as a high speed rotor. The blades 51 to 53 are planted on the outer peripheries of the disks 11 to 13, respectively. The turbine rotor 1 is connected to the compressor rotor 2 via a distance piece 33, and is rotatably supported by bearings.

With this configuration, an operational gas at a high temperature and a high pressure generated by the combustor 84 by using air compressed by the compressor flows in the gas path while being expanded, to rotate the turbine rotor, thereby generating a power.

If the pressure and temperature of the operational gas at the outlet of the combustor are set at 22–25 ata and 1500° C., respectively, it is possible to generate a power of 400 MW or more even in the case of using a gas turbine having a rotor diameter of about 2.5 m; however, in this case, the gas temperature at the inlet of each rotating blade, which is relative to the gas temperature (1500° C.) at the outlet of the combustor, is about 1250–1300° C. for the first stage blade, and about 950–1000° C. for the second stage blade. Such a gas temperature at the inlet of each moving blade largely exceeds the allowable temperature (850–900° C. for a usual blade material) of the blade. The heat loads applied to the first and second blades become about 1.5% (about 6000 kW) and 1.2% (5000 kW) of the power, respectively.

To set the pressure of the operational gas at a value of 22–25 ata, the compression ratio must be set at a value of 22 or more. In this case, the discharge temperature of the compressor becomes about 500° C., and therefore, in the case of using a usual rotor material (allowable temperature: 450° C.), it is required to cool the outer peripheral portion of the compressor rotor 2.

The gas turbine in this embodiment is additionally provided with a turbine stacking bolt 54, a compressor disk, a compressor blade 17, a compressor stacking bolt, and a compressor stub shaft. The gas turbine of this embodiment has the three stage turbine blades and the three stage turbine nozzles.

Each of the first stage nozzle 81 and the first stage blade 51 of the gas turbine in this embodiment is made from an Ni based super alloy casting having a single crystal structure which contains, on the weight basis, 4–10% of Cr, 0.5–1.5% of Mo, 4–10% of W, 1–4% of Re, 3–6% of Al, 4–10% of Ta, 0.5–10% of Co, and 0.03–0.2% of Hf. The first stage blade is obtained by solidifying molten metal in the direction from the leading end of the blade portion to a dovetail. The length of the blade portion is 130 mm, and the total length of the first stage blade is about 220 mm. The useful temperature under a service condition of $10^5$ h×14 kgf/mm² of the single crystal Ni-based alloy casting is in a range of 930 to 940° C. The first stage blade has complicated inner steam cooling holes for cooling it with compressed steam during operation of the gas turbine. The cooling system is a closed type having a cooling route which extends from the dovetail, passing through a plurality of passages provided in the blade portion, and returns to the dovetail. The single crystal casting is subjected to solution treatment at 1250–1350° C., and is then subjected to double aging treatments performed at 1000–1100° C. and at 850–950° C., to thereby precipitate γ'-phase particles, each of which has a length of one side ranging from 1 μm or less, at a 50–70 vol %.

The first stage nozzle 81 is made from an Ni based alloy having the same composition as that of the Ni based alloy used for the first stage blade 51 except for the Cr content. To be more specific, the Cr content of the Ni based alloy of the first stage nozzle 81 is larger than that of the Ni based alloy of the first stage blade 51 by 1–3%, that is, set at a value ranging from 6 to 10%.

Although the first stage blade 51 in this embodiment is entirely.made from a single crystal, portions other than the blade portion 21, that is, a shank 24 and a dovetail 26, may be made from a columnar crystal. To be more specific, according to this embodiment, the first stage blade 51 can be obtained by unidirectionally solidifying molten metal in the direction from the blade portion to the dovetail 26 via the shank 24. In this case, the first stage blade 51 can be entirely made from a single crystal by solidifying the metal structure from the blade portion in the unidirectional solidification to the shank 24 and the dovetail 26, or can be made into the columnar crystal structure by increasing cooling rate when the solidification reaches the shank 24 portion.

The first stage nozzle 81 in this embodiment has vanes 36, a side wall 38 on the outer peripheral side, and a side wall 37 on the inner peripheral side.

The first stage blade 51 has the blade portion, a platform, the shank, the X'mas-tree shaped dovetail, and two seal fins on each side of the dovetail. The first stage blade 51 is rounded at its one end on the upstream side and extends in a crescent shape to the downstream side. Each seal fin has a projection on the blade portion side. The dovetail has a sealing projection on its bottom. The shank is recessed at its central portion. The blade has a plurality of cooling holes and a cooling route through which a coolant flows from the dovetail side and returns thereto. The seal fins are provided for preventing leakage of combustion gas.

The second stage blade 52 and the third stage blade 53 are each made from a Ni based super alloy having a columnar crystal structure obtained by unidirectional solidification. The Ni based super alloy contains, on the weight basis, 5–18% of Cr, 0.3–6% of Mo, 2–10% of W, 2.5–6% of Al, 0.5–5% of Ti, 1–4% of Ta, 0.1–3% of Nb, 0–10% of Co, 0.05–0.21% of C, 0.005–0.025% of B, 0.03–2% of:Hf; and 0.1–5% of Re. The blade has the columnar crystal structure obtained by unidirectional solidification in the direction from the leading end to the dovetail. Like the first stage blade, and third stage blades has inner cooling holes and a cooling route through which high pressure steam flows from the dovetail side, cooling the blade, and returns to the dovetail side. The useful temperature of the material of each of the second and third stage blades under a service condition of $10^5$ h×14 kgf/mm² is preferably in a range of 840 to 860° C. To enhance the corrosion resistance of each of the second and third stage blades, a layer of a Ni-based or (Ni+Co) based alloy containing, on the weight basis, 2–5% of Al, 20–30% of Cr, and 0.1–1% of Y is formed on the blade surface to a thickness of 50–150 μm under a non-oxidized low pressure atmosphere by plasma spraying. The alloy layer is formed on the side, being in contact with flame, of each of the blade portion and the platform. The dovetail has seal fins. The third stage blade is solid, that is, it has no cooling hole.

The first stage nozzle in this embodiment has the two vanes integrally formed between the outer and inner peripheral side walls. The two vanes and the side walls are made from an Ni-based alloy having a single crystal structure. The vane is rounded at its one end and extends in a crescent shape, and it has a cavity into or from which cooling steam flows. The wall is made of a thin-thickness material having the cavity. The vane portion has a plurality of cooling holes from which cooling air flows from the outer peripheral side wall and returns again to the outer peripheral side wall.

The useful temperature under a service condition of $10^5$ h×6 kgf/mm² of the first stage nozzle made from the Ni-based alloy single crystal in this embodiment is in a range of 920 to 940° C. The cooling passage is of a closed type, which extends from the outer peripheral side wall provided with a plurality of the cooling holes on the blade portion, passing through a plurality of cooling holes provided in the vanes, and returns to the outer peripheral side wall. A heat insulating coating layer is provided on the blade portion and the platform, and the blade portion and the side walls of the first stage nozzle being in contact with flame, of the first stage blade. The heat insulating layer is formed to a thickness of 100 to 200 μm by vapor-deposition of a stabilized zirconium layer which contains 10% or less of $Y_2O_3$, and $Y_2O_3$ being composed of fine columnar crystals in the deposition direction, more concretely, it has a double layer structure in which fine columnar crystal particles each having a diameter of 10 μm or less are dispersed in macro columnar crystal particles each having a diameter of 50 to 200 μm. An alloy layer is further formed between the base metal and the zirconium layer. The binding layer is formed by spraying an alloy material containing, on the weight basis, 2–5% of Al, 20–30% of Cr, and 0.1–1% of Y, the balance being Ni or (Ni+Co). The binding layer has an effect of improving the corrosion resistance. The above-described Ni-based alloy casting is subjected to solution treatment at a temperature ranging from 1150 to 1200° C. and then to one stage aging treatment at a temperature ranging from 820 to 880° C.

The second and third nozzles are each made from an Ni-based super alloy containing, on the weight basis, 21–24% of Cr, 18–23% of Co, 0.05–0.20% of C, 1–8% of W, 1–2% of Al, 2–3% of Ti, 0.5–1.5% of Ta, and 0.05–0.15% of B. These nozzles are formed by casting in accordance with the usual manner. The casting of the Ni-based alloy thus obtained has an equi-axed crystal structure. It is not required to provide a heat insulating layer on each of the second and third stage nozzles; however, to enhance the corrosion resistance, a diffusion coating of Cr or Al is formed on the second stage nozzle. In addition, the same diffusion coating layer can be formed on the third stage nozzle. Each of the second and third nozzles has inner cooling holes and has a cooling route through which compressed air flows in the nozzle from the leading side and flows out of the nozzle from the trailing side to cool it. The material of each of the second and third stage nozzles has a useful temperature of 840–860° C. under a service condition of $10^5$ h×6 kgf/mm². This casting is subjected to the same heat-treatment as described above. The center of each of the second and third stage nozzles is aligned with an approximately center position between the corresponding blades.

The entire structure of the second stage turbine nozzle, which is substantially the same as that of the first stage nozzle, has two vanes and an cooling mechanism by utilizing above. With respect to the cooling mechanism, cooling air flows in the nozzle from the outer peripheral side wall and flows out of the nozzle from the inner peripheral side wall, and the leading end of each vane has cooling holes through which air flows out from the trailing edge on the downstream side of the vane. The vane has a cavity, and the thickness of the vane is set in a range of 0.5 to 3 mm. The second stage turbine nozzle in this embodiment has the two vanes; however, it may be configured to have one vane through three vanes.

The entire structure of the third stage nozzle, which is substantially the same as that of the second stage nozzle, has an air cooling mechanism in which cooling air flows in the nozzle from the outer peripheral side wall, passing through vanes each having a thin-wall thickness of about 0.5 to 3 mm, and flows out of the nozzles from the trailing edge on the downstream side of the combustion gas. In the third stage nozzle of this embodiment, two vanes are integrally formed between the side walls; however, one vane, two vanes or three vanes may be provided for one nozzle.

A method of producing the first stage blade by casting will be described below. A wax pattern having the product shape was formed around cores each having a cavity mechanism with a size corresponding to that of a cooling hole, and a coating layer made from molding sands to be described later was formed on the outer periphery of the wax pattern. The wax pattern on which the coating layer was formed was then dewaxed and baked, to obtain a mold. Next, a master ingot having the above-described composition was melted and was poured in the mold in a vacuum unidirectional solidification furnace. The molten metal was sequentially unidirectionally solidified at a lowering speed of 5–30 cm/h in the direction from a starter portion, a blade portion, a platform, a shank portion, and a dovetail, to obtain a single crystal Ni-based alloy casting provided with a selector. Then, the cores were removed by using alkali, and the starter portion, the selector, and extended riser were cut. In this way, a gas turbine blade having a specific shape was obtained.

Each of the second and third stage gas turbine blades, which is made from an unidirectionally solidified Ni-based alloy casting having a columnar structure, can be produced in accordance with the same unidirectional solidification method as described above except that the lowering speed is larger than that for producing the first stage blade made from the Ni-based alloy casting having the single crystal structure, and more concretely, the lowering speed may be set at 30–50 cm/h.

The blade thus obtained was subjected to solution treatment and aging treatment for controlling the metal structure, to thereby obtain a specific strength.

Next, a method of producing the first stage nozzle in this embodiment by casting will be described below. A wax pattern was formed around cores each having a cavity mechanism with a size corresponding to a cooling hole. The wax pattern was dipped in a solution prepared by dissolving an acrylic resin in methyl ethyl ketone, being dried by air, and was dipped in a slurry (zirconia flower+colloidal silica+alcohol). Then, coating layers were stacked on the wax pattern by blasting zirconia sands as a first layer, and repeatedly blasting chamotte sands as second and later layers, to form a mold. The mold was dewaxed and baked at 900° C.

Next, the mold was placed in a vacuum furnace, and then a master ingot was vacuum-melted and vacuum-poured in the mold. The molten metal was sequentially unidirectionally solidified, like the above-described blade, in the direction from a starter portion, an outer peripheral side wall, vanes, and an inner peripheral side wall, to obtain a nozzle made from an Ni-based alloy casting having a single crystal structure. With respect to the nozzle, a blade portion between the side walls has a width of about 74 mm, a length of 110 mm (the length at the thickest portion: 25 mm), and a wall thickness of 3–4 mm (the thickness at the leading end: about 0.7 mm).

Like the blade, the nozzle thus obtained was subjected to solution treatment and aging treatment for controlling the metal structure, to thereby obtain a specific strength.

Sample Nos. 1 to 4 in Table 1 show examples of single crystal Ni-based alloys used for the first stage blade and the first stage nozzle in this embodiment (single crystal: SC, columnar crystal: DS, equi-axed crystal: CC).

Cr is effective to improve the oxidation resistance and corrosion resistance. Al is a primary reinforcing element of forming a γ'-phase as an intermetallic compound for reinforcing the Ni-based super heat-resisting alloy by precipitation. The γ'-phase, which has a basic composition of Ni$_3$Al, is further reinforced by solid-dissolving an element such as Ti, Ta, W, Mo or Nb in the γ'-phase, other than Al. Nb is an important element which is added, together with Re, to enhance the corrosion resistance of the alloy. The addition of Co is effective to improve the corrosion resistance and oxidation resistance. From the viewpoint of strength, Co has a function of lowering a stacking fault energy of the alloy thereby improving the creep strength at a relatively low temperature, and a function of increasing the solid solubility of the γ'-phase in a high temperature region, to weaken the reinforcing effect due to precipitation, thereby making insufficient the creep strength in the high temperature region. To obtain the suitable strength by matching both the conflicting functions with each other, the added amount of Co should be optimized. Hf is an important element of improving oxidation resistance and high-temperature strength of the alloy. The effect by adding Hf can be achieved by addition of Hf only in a trace amount. The excessive addition of Hf, however, lowers the melting point of the alloy, with a result that the eutectic γ'-phase cannot be sufficiently solid-dissolved in the matrix of the alloy. Re is solid-dissolved in the γ-phase to reinforce the matrix, and also enhances the corrosion resistance of the alloy. The excessive addition of Re in an amount of more than 4%, however, causes the precipitation of harmful phases of Re—W, Re—Mo, and Re—Ta.

Sample Nos. 5 and 6 in Table 1 show examples of the unidirectionally solidified columnar crystal Ni-based alloys used for the second and third stage blades in this embodiment.

With respect to each of the materials used for the second and third stage nozzles for the gas turbine for power generation according to the present invention, the alloy composition (wt %), casting method, useful temperature in a service condition of $10^5$ h×6kgf/mm$^2$, and weldability are shown in Table 2. The function of each element composing the alloy is substantially as described above. Each alloy shown in this embodiment has the composition with more emphasis on the weldability than the composition of the above-described Ni-based alloy. In Table 2, Sample No. 8 is excellent in high-temperature strength but is inferior in weldability to Sample Nos. 7 and 8. Sample No. 2N2 is most preferable in weldability but is inferior in high-temperature strength to each of the other samples. Accordingly, in consideration of the balance of the weldability and high-temperature strength, Sample No. 7 is most preferable. This is due to strict control of the (Al+Ti) amount and the additional effect of W. In addition, the weldability is evaluated by checking whether or not cracks occur in beads of one pass (length: 80 mm, width: 8 mm) formed by a TIG welding process at a pre-heating temperature of 400° C. or less.

In this embodiment, each one of the turbine disks 11, 12 and 13 is made from a forged material having a full-martensite structure containing, on the weight basis, 0.05 to 0.20% of C, 0.15% or less of Si, 0.2% or less of Mn, 10–13% of Cr, 0.5–3.0% of Ni, 1.0–4.0% of Mo, 0.1–0.4% of V, 0.01–0.20% of Nb, 0.025–0.125% of N, and 1.0–5.0% of Co. The concrete composition (wt %) of each martensite steel is shown in Table 3. The balance is of Fe. The martensite steel has $10^5$ h creep rupture strength (at 475°) of 50 kgf/mm$^2$, which is sufficient as the strength of the material for the high-temperature gas turbine.

TABLE 1

| No. | casting method | Ni | C | Cr | Co | W | Re | Mo | Ta | Nb | Al | Ti | Hf | B | Zr | useful temperature (° C.) | corrosion loss (mg/cm$^2$) |
|---|---|---|---|---|---|---|---|---|---|---|---|---|---|---|---|---|---|
| 1 | SC | bal. | — | 7.5 | 0.8 | 7.2 | 1.5 | 0.8 | 8.8 | 1.7 | 5.0 | — | 0.1 | — | — | 940 | 203 |
| 2 | SC | bal. | — | 7.5 | 1.0 | 9.5 | 1.4 | 0.8 | 7.2 | 1.7 | 5.2 | — | 0.1 | — | — | 940 | 289 |
| 3 | SC | bal. | — | 7.9 | 1.0 | 9.5 | 1.6 | 0.9 | 6.7 | 1.6 | 4.6 | — | 0.1 | — | — | 940 | 236 |
| 4 | SC | bal. | — | 6.6 | 9.6 | 6.4 | 3.0 | 0.6 | 6.5 | — | 5.6 | — | 0.1 | — | — | 930 | 533 |
| 5 | DS | bal. | 0.07 | 6.6 | 9.2 | 8.5 | 3.0 | 0.5 | 3.2 | — | 5.6 | 0.7 | 1.4 | 0.015 | 0.015 | 900 | 587 |
| 6 | DS | bal. | 0.07 | 8.1 | 9.2 | 9.5 | — | 0.5 | 3.2 | — | 5.6 | 0.7 | 1.4 | 0.015 | 0.006 | 890 | 560 |

TABLE 2

| No. | casting method | Ni | C | Cr | Co | W | Fe | Mo | Ta | Nb | Al | Ti | Zr | B | weldability | useful temperature (° C.) |
|---|---|---|---|---|---|---|---|---|---|---|---|---|---|---|---|---|
| 7 | CC | bal. | 0.10 | 23.0 | 22.0 | 7.0 | — | — | 1.2 | — | 1.8 | 2.7 | — | 0.01 | ○ | 875 |
| 8 | CC | bal. | 0.10 | 22.0 | 19.0 | 2.0 | — | — | 1.0 | — | 1.2 | 2.3 | — | 0.01 | ○ | 843 |
| 9 | CC | bal. | 0.15 | 22.5 | 19.0 | 2.0 | — | — | 1.4 | — | 1.9 | 3.7 | 0.10 | 0.01 | Δ | 887 |

(Weldability ○:No crack in beads of one pass with length of 80 mm and width of 8 mm welded by TIG welding process at pre-heating temperature of 400° C. or less)

Samples of these martensite steels were produced as follows. First, 150 kg of an ingot was melted in a high frequency induction melting furnace, being carbon-deoxidized in vacuum, and cast in a mold. The casting thus obtained was heated at 1150° C. and formed into a plate shape by hot-forging. The plate-shaped product was then subjected to solution treatment at 1050° C. and air-cooled to room temperature (that is, quenched), and was subjected to primary tempering at 570° C. and secondary tempering at 590° C. and 620° C. A polished creep rupture test piece (JIS Z 2272, ASTM E292), a tensile test piece (JIS G 0567), and a Charpy impact test piece (JIS Z 2202) were taken from each sample; and were tested. The result of $10^5$ h creep rupture strength (at 500° C.) is shown in Table 2. The smaller the added amount of Ni, the higher the creep strength. Also, the lower the tempering temperature, the higher the creep strength. The creep strength of the sample subjected to tempering at 620° C. cannot satisfy a standard value of the creep strength ($\geq 50$ kgf/mm$^2$). Accordingly, it was confirmed that the creep rupture strength of the martensite steel of the present invention can be increased to a value necessary for the disk of the high-temperature gas turbine by reducing the added amount of Ni and the lowering the tempering temperature.

TABLE 3

| No. | C | Si | Mn | Ni | Cr | Mo | V | Nb | N | Co |
|---|---|---|---|---|---|---|---|---|---|---|
| 1 | 0.11 | 0.01 | 0.02 | 1.00 | 11.50 | 1.9 | 0.20 | 0.15 | 0.04 | 3.00 |
| 2 | 0.11 | 0.01 | 0.02 | 1.50 | 11.50 | 1.9 | 0.20 | 0.15 | 0.04 | 3.00 |
| 3 | 0.11 | 0.01 | 0.02 | 2.00 | 11.50 | 1.9 | 0.20 | 0.15 | 0.04 | 3.00 |

TABLE 4

| No. | hardening temperature (° C.) | tempering temperature (° C.) | creep rupture strength (kgf/mm$^2$) |
|---|---|---|---|
| 1 | 1050 | 590 | 52.0 |
|  |  | 620 | 50.8 |
| 2 | 1050 | 590 | 50.5 |
|  |  | 620 | 50.0 |
| 3 | 1050 | 590 | 50.2 |
|  |  | 620 | 49.7 |

Figure 3:
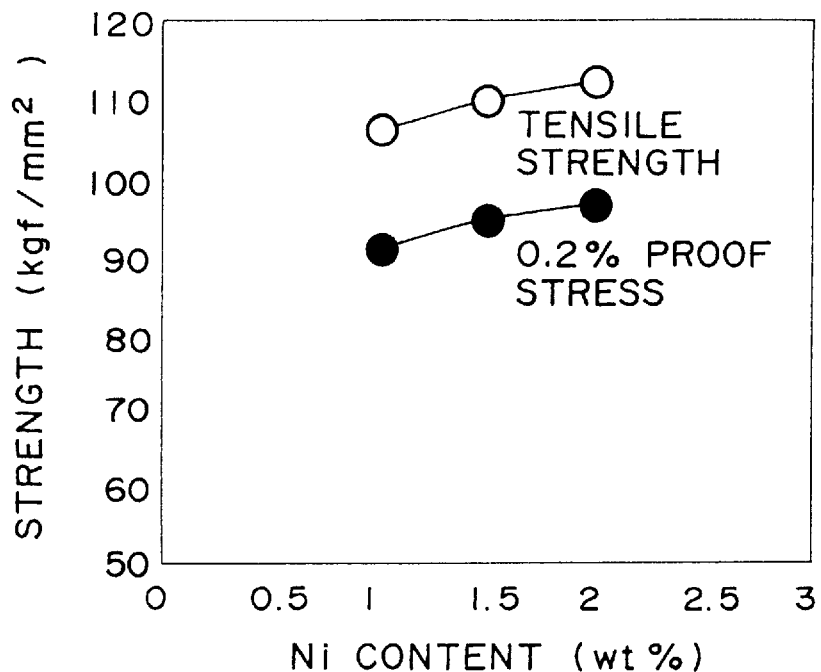
FIG. 3 is a diagram showing a relationship between the tensile strength and the Ni content.
Figure 4:
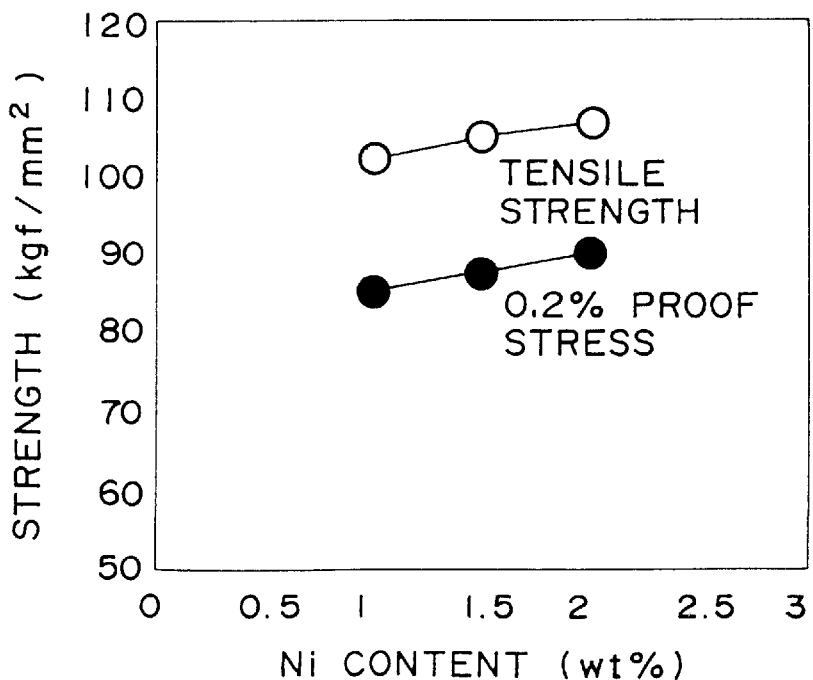
FIG. 4 is a diagram showing a relationship between the tensile strength and the Ni content.
Figure 5:
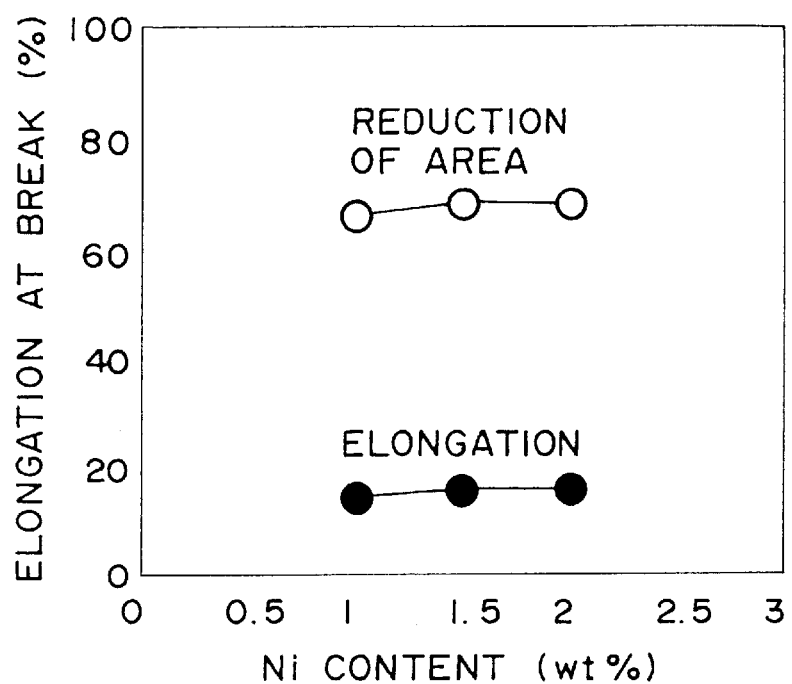
FIG. 5 is a diagram showing a relationship between the elongation at break and the Ni content.
Figure 6:
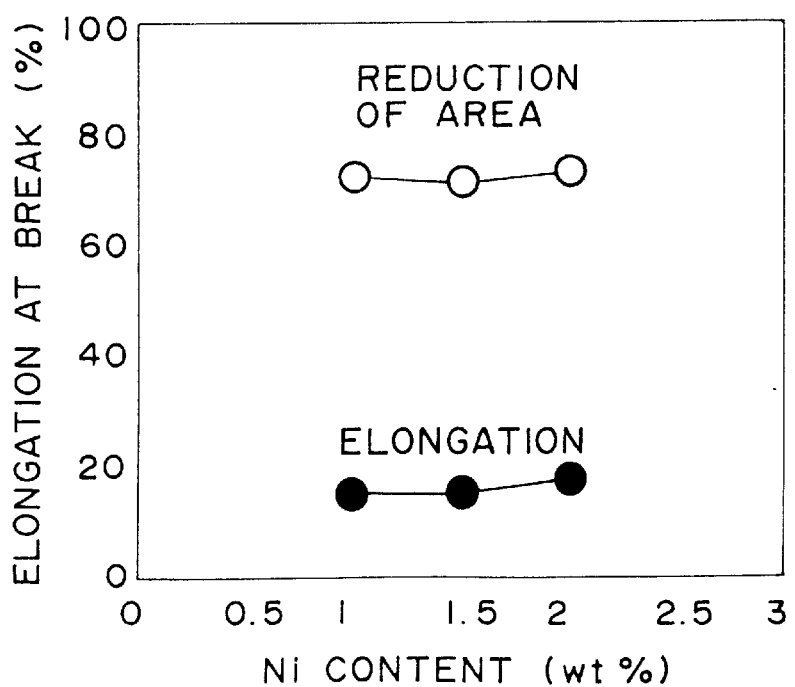
FIG. 6 is a diagram showing a relationship between the elongation at break and the Ni content.

The tensile strength and 0.2% proof stress, which are a strength factor of the tensile test, of the martensite steel subjected to tempering at 590° C. are shown in FIG. 3, and the tensile strength and 0.2% proof stress of the martensite steel subjected to tempering at 620° C. are shown in FIG. 4. Further, the elongation and reduction in area, which are an elongation factor of the tensile test, of the martensite steel subjected to tempering at 590° C. are shown in FIG. 5, and the elongation and reduction in area of the martensite steel subjected to tempering at 620° C. are shown in FIG. 6. The added amount of Ni exhibits a positive dependency on the strength factor. To be more specific, as the added amount of Ni is increased, the strength factor is enhanced. The added amount of Ni does not clearly exhibit a dependency on the elongation factor. The tempering temperature exhibits a negative dependency on the strength factor. To be more specific, as the tempering temperature is increased, the strength is reduced. The strength of the martensite steel subjected to tempering at 590° C. satisfies a necessary strength factor (tensile strength $\geq 107.5$ kgf/mm$^2$, 0.2% proof stress $\geq 86.5$ kgf/mm$^2$); however, the martensite steel subjected to tempering at 620° C. does not satisfy the necessary strength factor. The tempering temperature does not exhibit a significant dependency on the elongation factor. The elongation of each of the martensite steels subjected to tempering at 590° C. and 620° C. satisfies a necessary elongation factor (elongation $\geq 13.0\%$, reduction of area $\geq 30.0\%$).

Figure 7:
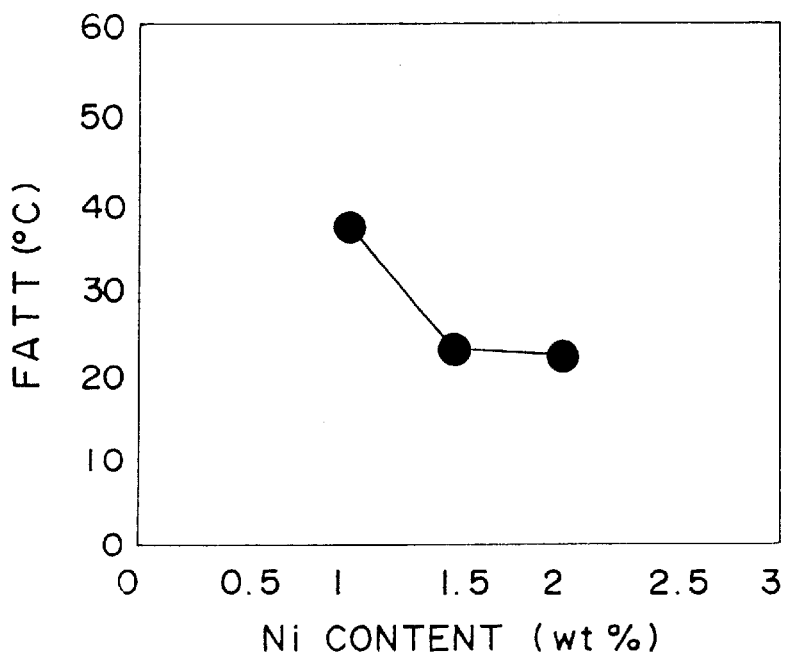
FIG. 7 is a diagram showing a relationship between the FATT and the Ni content.
Figure 8:
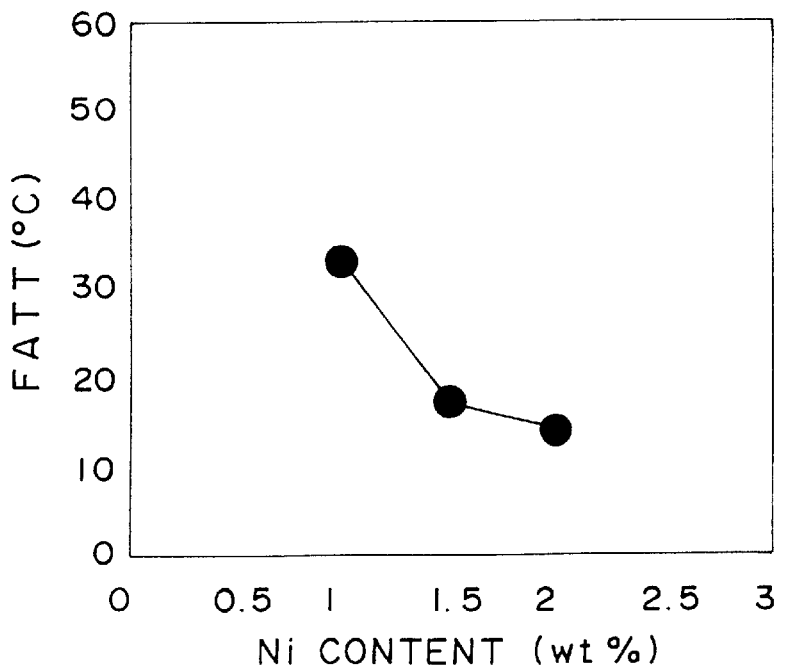
FIG. 8 is a diagram showing a relationship between the FATT and the Ni content.

The FATT, used for evaluation of the toughness, of the martensite steel subjected to tempering at 590° C. is shown in FIG. 7, and the FATT of the martensite steel subjected to tempering at 620° C. is shown in FIG. 8. The added amount of Ni exhibits a negative dependency on the temperature (FATT). To be more specific, as the added amount of Ni is increased, the toughness is enhanced. The tempering temperature exhibits a negative dependency on the FATT. To be more specific, as the tempering temperature is increased, the toughness is enhanced. Further, in the case of each of the martensite steels subjected to either tempering at 590° C. or 620° C., if the martensite steel contains 1.5 wt % or more of Ni, it exhibits a FATT capable of satisfying the necessary value ($\leq 26.6°$ C.).

From the above-described test results, it is apparent that the material in this embodiment is usable for the stacking bolt, distant piece and spacer, in addition to the gas turbine disk of the gas turbine of the 1500° C. class in terms of the combustion gas temperature at the inlet of the first stage turbine nozzle.

In the gas turbine of the present invention, the gas temperature at the inlet of the first stage nozzle is 1500° C.; the gas temperature at the inlet of the second stage nozzle is 1100° C.; and the gas temperature at the inlet of the third stage nozzle is 850° C., and therefore, the metal temperature of the first stage nozzle becomes 900° C. or more even in consideration of cooling. At a region effected with this temperature of the first stage nozzle, the strength of a Co-based alloy is superior to an Ni-based alloy for nozzles. Accordingly, it may be most desirable that the first stage nozzle is made from the Co-based alloy excellent in weldability. On the other hand, the metal temperature of the second stage and later stage nozzles is 800° C. or less, and at such a temperature region, the Ni-based alloy for nozzles is higher in creep strength to the Co-based alloy. Accordingly, it may be desirable that the second stage and later stage nozzles are made from a polycrystalline Ni-based alloy. In the gas turbine having the turbine inlet temperature of 1500° C., it may be most desirable that the first stage nozzle is made from a single crystal Ni-based alloy and the second stage and later stage nozzles may be made from the polycrystalline Ni-based alloy.

A compressor having blades arranged in seventeen stages is designed to obtain an air compression ratio of 18.

The fuel used for the compressor is natural gas or light oil.

With this configuration, by making the compressor disks, distant piece, turbine disks, and spacers constituting the axis of the rotating portion from the martensite steel, the heat efficiency upon start-up can be ensured because the martensite steel has a thermal expansion coefficient similar to that of a ferrite based iron steel forming structural members for holding the entire gas turbine, and hence to achieve the stable operation in a short time. As a result, there can be obtained a highly balanced, highly reliable gas turbine as a whole. Further, there can be obtained a gas turbine for power generation which exhibits a power generation efficiency of 37% or more in LHV under a temperature condition in which the gas temperature at the inlet of the first stage turbine nozzle is 1500° C.; the metal temperature of the first stage turbine blade is 920° C.; and the exhaust gas temperature of the gas turbine is 650° C.

The gas turbine in this embodiment is of the three stage type gas turbine; however, a four stage type gas turbine can be similarly combined with the steam turbine in this embodiment. In the case of adopting the four stage type gas turbine, first and second stage blades and nozzles may be made from the same materials as those of the first and second blades and nozzles in this embodiment and are cooled in the same manner as that used for the first and second stage blades and nozzles in this embodiment, and the third and fourth stage blades and nozzles may be made from the same materials as those of the third stage blade and nozzle and are cooled in the same manner as that used for the third stage blade and nozzle.

B. High Pressure-Intermediate Pressure-Low Pressure Integral Type Steam Turbine

Figure 9:
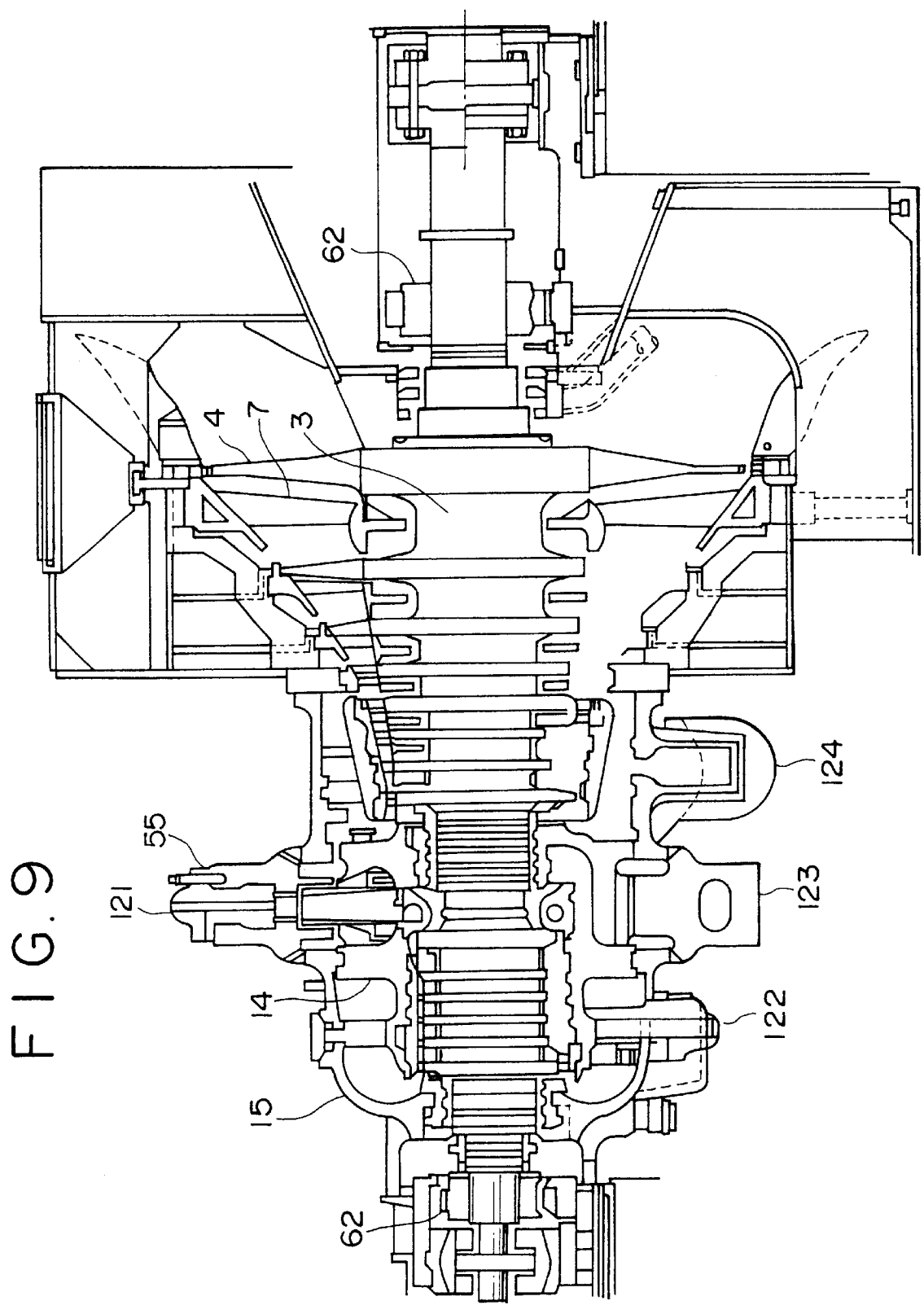
FIG. 9 is a plan view of a high pressure-intermediate pressure-low pressure integral type steam turbine.

FIG. 9 is a partial sectional view of a reheat type high pressure-intermediate pressure-low pressure integral type steam turbine according to the present invention.

The reheat type steam turbine of the present invention has fourteen stage blades 4 planted on a high pressure-low pressure integral type rotor shaft 3. To be more specific, the fourteen stage blades 4 are arranged in six stages at the high pressure portion, four stages at the intermediate pressure portion, and four stages at the low pressure portion. Another steam turbine having blades arranged in eighteen stages: seven stages at the high pressure portion, six stages at the intermediate pressure portion, and five stages at the low pressure portion has the same structure as that shown in FIG. 9. Each of the high pressure portion and the intermediate pressure portion is provided with an inner casing. In this embodiment, as described above, the temperature of the exhaust gas discharged from the gas turbine is 650° C. Such exhaust gas is fed to an exhaust gas heat recovery boiler (HRSG) to obtain high pressure steam at 538° C. The high pressure steam passes through a steam control valve 55, and flows on the high temperature-high pressure side (538° C. and 169 atg) through a steam inlet 121. The steam flows leftward from the steam inlet 121, and goes out of a high pressure steam outlet 122; and is heated again at 538° C., and is fed to the intermediate pressure turbine portion through a reheat steam inlet 123. The steam having entered in the intermediate pressure turbine portion is fed to the low pressure turbine portion and simultaneously steam is fed to the low pressure turbine portion through a low pressure steam inlet 124. The steam temperature and the steam pressure of the steam are reduced to 33° C. and 722 mmHg. The steam is then discharged from the final stage blade 4. The high pressure-low pressure integral type rotor shaft 3 of the present invention is exposed to the steam temperature ranging from 538° C. to 33° C., and therefore, it is made from the above-described Ni—Cr—Mo—V low alloy forged steel. The planting portions, on which the blades 4 are planted, of the high pressure-low pressure integral type rotor shaft 3 are formed into disk-shapes by cutting. The length of the disk portion becomes longer as the length of the blade becomes shorter for reducing vibration. The blades 4 on the high pressure side with respect to the steam inlet are arranged in six stages. The second stage and later blades 4 are spaced at equal intervals. The gap between the first and second stage blades 4 is as large as 1.5 to 2.0 times the interval between adjacent two of the second stage and later blades 4. The axial width of the blade planting portion is thickest at the first stage, and becomes thick stepwise in the direction from the second-stage to the final stage. The axial width of the first stage blade planting portion is as thick as 2 to 2.6 times the axial width of the second stage blade planting portion.

The blades 4 on the intermediate pressure side with respect to the steam inlet are arranged in four stages. The axial width of the blade planting portion at the first stage, which is equal to that at the final stage, is thickest, and the axial width of the blade planting portion becomes thicker toward the downstream side, that is, toward the second stage and later stages. The blades 4 at the low pressure portion are arranged in four stages. The axial width of the blade planting portion at the final stage is as thicker as 2.7 to 3.3 times that at the stage preceding from the final stage, and the axial width of the blade planting portion at the stage preceding from the final stage is as thicker as 1.1 to 1.3 times that at the stage preceding therefrom. At the intermediate pressure portion, the gap between the centers of adjacent two of the first to fourth stage blades is substantially constant. At the low pressure portion, the gap between the centers of adjacent two of the blades becomes larger in the direction from the first stage to the final stage; the ratio between the gap between adjacent two and the gap between the next adjacent two becomes large on the downstream side; and the gap between the second and third stages is as large as 1.1 to 1.2 times the gap between the first and second stages and the gap between the final stage and the stage preceding therefrom is as large as 1.5 to 1.7 times the gap between the stage preceding from the final stage and the stage therefrom.

On the intermediate pressure and low pressure side, the blade length becomes gradually large in the direction from the first stage to the final stage; and the length of each stage is as large as 1.2 to 2.1 times the length of the stage preceding therefrom, particularly, 1.2 to 1.35 times the length of the stage preceding therefrom in the range from the first stage to fifth stage. At the low pressure portion, the length of the second stage is as large as 1.5 to 1.7 times the length of the first stage, and the length of the third stage or fourth stage is as large as 1.9 to 2.1 times the length of the second stage or third stage.

In this embodiment, the lengths of the blades at the intermediate pressure portion and the low pressure portion are 2.5", 3", 4", 5", 6.3", 10", 20.7" and 40".

In FIG. 9, reference numeral 14 designates the inner casing, and 15 designates the outer casing.

(1) Rotor Shaft

Table 5 shows chemical composition of typical samples used for testing the toughness and creep rupture strength of the material of the high pressure-intermediate pressure-low pressure integral type steam turbine rotor according to the present invention. The sample was produced by melting a raw ingot in a vacuum high frequency melting furnace, casting a molten metal in a mold, and hot-forging the casting into a shape of 30 mm×30 mm at a temperature ranging from 850 to 1150° C. Sample Nos. 3 to 12 show inventive materials, and Sample Nos. 1 and 2 show comparative materials. Sample No. 1 is the material equivalent to ASTM A470 class 8, and Sample No. 2 is the material equivalent to ASTM A479 class 7. These samples were heat-treated under conditions obtained by simulating the conditions of the central portion of the high pressure-intermediate pressure-low pressure integral type steam turbine rotor shaft. To be more specific, each sample was heated at 950° C. to transform the metal structure to an austenite structure and cooled at a cooling rate of 100° C./h (quenched); and heated at 665° C.×40 h and cooled in a furnace (tempered). The Cr—Mo—V steel of the present invention has a full bainite structure with no ferrite phase.

The rotor shaft in this embodiment is preferably made from a forged steel having a full-temper bainite structure containing, on the weight basis, 0.05–0.30%, preferably, 0.18–0.25% of C, 0.1% or less, preferably, 0.06% or less of Si, 0.3% or less, preferably, 0.02 to 0.20% of Mn, 1.0–2.5%, preferably, 1.5–2.0% of Ni, 0.8–3.0%, preferably, 1.5–2.5% of Cr, 0.5–2.5%, preferably, 0.8–1.5% of Mo, and 0.10–0.35%, preferably, 0.15–0.30% of V. The steel is preferably further contains at least one kind of 0.01–0.10%, preferably, 0.015–0.050% of Nb, and 0.1–0.5% of W.

Sample Nos. 7 to 12 are characterized in that the toughness is improved by adding Ca, rare earth elements (La—Ce), Al, Ta, and Zr, respectively. In particular, the addition of the rare earth elements is effective to improve the toughness. It is confirmed that not only the addition of (La—Ce) but also the addition of Y is significantly effective to improve the toughness.

The limitation of the content of $O_2$ to 100 ppm or less is effective to obtain a high strength of about 12 kg/mm$^2$. In particular, the limitation of the content of $O_2$ to 80 ppm or less is effective to obtain a high creep rupture strength of 15 kg/mm$^2$ or more, and further the limitation of the content of $O_2$ to 40 ppm or less is effective to obtain a high creep rupture strength of 18 kg/mm$^2$ or more.

The $10^5$ h creep rupture strength at 538° C. is reduced as the Ni content is increased. In particular, when the Ni content is in a range of 2% or less, the strength becomes about 11 kg/mm$^2$ or more, and further, when the Ni content is in a range of 1.9% or less, the strength becomes 12 kg/mm$^2$ or more.

For the material containing Ni in a range of 1.52 to 2.0%, the ratio Mn/Ni or the ratio (Si+Mn)/Ni was examined. As a result, it was confirmed that when the ratio Mn/Ni is in a range of 0.12 or less and the ratio (Si+Mn)/Ni is in a range of 0.04 to 0.18, the impact value becomes as high as 2.5 kg-m or more.

The austenitizing temperature of the steel of the present invention is preferably in a range of 870 to 1000° C. for

TABLE 5

| No. | C | Si | Mn | P | S | Ni | Cr | Mo | W | V | Nb | | (ppm) $O_2$ | Ni Mo | Cr Mo | Mn Ni |
|---|---|---|---|---|---|---|---|---|---|---|---|---|---|---|---|---|
| 1 | 0.33 | 0.27 | 0.77 | 0.007 | 0.010 | 0.34 | 1.06 | 1.28 | — | 0.27 | — | — | 26 | 0.27 | 0.83 | 2.26 |
| 2 | 0.23 | 0.05 | 0.30 | 0.009 | 0.012 | 3.56 | 1.66 | 0.40 | — | 0.12 | — | — | 20 | 8.90 | 4.15 | 0.084 |
| 3 | 0.26 | 0.02 | 0.16 | 0.003 | 0.004 | 1.84 | 1.95 | 1.10 | — | 0.27 | — | — | 18 | 1.67 | 1.77 | 0.092 |
| 4 | 0.24 | 0.02 | 0.18 | 0.001 | 0.006 | 1.90 | 1.91 | 1.18 | — | 0.29 | 0.03 | — | 10 | 1.61 | 1.62 | 0.106 |
| 5 | 0.23 | 0.03 | 0.19 | 0.002 | 0.006 | 1.65 | 1.88 | 1.11 | 0.20 | 0.26 | — | — | 18 | 1.67 | 1.69 | 0.103 |
| 6 | 0.24 | 0.02 | 0.19 | 0.001 | 0.007 | 1.89 | 1.92 | 1.10 | 0.23 | 0.26 | 0.03 | — | 20 | 1.72 | 1.75 | 0.101 |
| 7 | 0.22 | 0.04 | 0.18 | 0.009 | 0.008 | 1.83 | 1.65 | 1.16 | 0.28 | 0.26 | — | Ti 0.03 B 0.004 | 20 | 1.58 | 1.59 | 0.098 |
| 8 | 0.24 | 0.05 | 0.19 | 0.005 | 0.007 | 1.85 | 1.97 | 1.18 | — | 0.28 | 0.05 | Ca 0.008 | 18 | 1.57 | 1.68 | 0.103 |
| 9 | 0.26 | 0.03 | 0.19 | 0.008 | 0.010 | 1.89 | 1.99 | 1.20 | — | 0.26 | 0.04 | La 0.08 Ce 0.08 | 18 | 1.58 | 1.66 | 0.101 |
| 10 | 0.23 | 0.05 | 0.24 | 0.006 | 0.008 | 1.90 | 1.91 | 1.16 | 0.24 | 0.26 | — | Al 0.008 | 16 | 1.65 | 1.65 | 0.126 |
| 11 | 0.26 | 0.05 | 0.18 | 0.007 | 0.006 | 1.80 | 1.90 | 1.23 | — | 0.24 | — | Ta 0.08 | 12 | 1.46 | 1.54 | 0.100 |
| 12 | 0.25 | 0.04 | 0.18 | 0.009 | 0.009 | 1.86 | 1.69 | 1.23 | 0.14 | 0.26 | — | Zr 0.30 | 16 | 1.51 | 1.37 | 0.097 |

The austenitizing temperature of the steel of the present invention is required to be in a range of 900 to 1000° C. If it is less than 900° C., a high toughness can be obtained but the creep rupture strength becomes low. If it is more than 1000° C., a high creep rupture strength can be obtained but the toughness becomes low. The tempering temperature of the steel of the present invention is required to be in a range of 630 to 700° C. If it is less than 630° C., as high toughness cannot be obtained, and if it is more than 700° C., a high creep rupture strength cannot be obtained.

Table 6 shows the results of a tensile test, an impact test and a creep rupture test. The toughness is expressed by a V-notch Charpy impact absorption energy tested at 20° C. The creep rupture strength is expressed by a $10^5$ h strength (at 538° C.) obtained by a Larsson-Miller method. As is apparent from the table, the material of the present invention exhibits a tensile strength at room temperature in a range of 88 kg/mm$^2$ or more; 0.2% proof stress in a range of 70 kg/mm$^2$ or more; a FATT in a range of 40° C. or less; the impact absorption energy (before and after heating) in a range of 2.5 kg-m or more; and a creep rupture strength in a range of about 11 kg/mm$^2$ or more, and is very useful for the high pressure-intermediate pressure-low pressure integral type turbine rotor shaft. In particular, the material having a strength of about 15 kg/mm$^2$ or more is suitable for a turbine rotor on which 33.5 inch long-blades are planted.

TABLE 6

| No. | tensile strength (kg/mm$^2$) | elongation (%) | reduction (%) | impact absorption energy (kg-m) | 50% FATT (° C.) | notching creep rupture (kg/mm$^2$) |
|---|---|---|---|---|---|---|
| 1 | 88.1 | 20.1 | 60.8 | 1.3 | 120 | 14.0 |
| 2 | 72.4 | 25.2 | 75.2 | 12.0 | −20 | 6.5 |
| 3 | 88.9 | 21.4 | 70.9 | 8.9 | 35 | 17.5 |
| 4 | 89.0 | 21.9 | 71.8 | 9.8 | 28 | 18.8 |
| 5 | 88.5 | 23.6 | 73.0 | 6.8 | 39 | 19.8 |
| 6 | 88.8 | 21.8 | 72.3 | 7.8 | 34 | 18.4 |
| 7 | 89.8 | 21.8 | 71.4 | 10.6 | 5 | 19.3 |
| 8 | 88.8 | 22.8 | 72.8 | 11.9 | −2 | 18.8 |
| 9 | 88.5 | 22.9 | 72.8 | 13.9 | −9 | 19.8 |
| 10 | 91.8 | 20.0 | 70.8 | 10.9 | 3 | 18.4 |
| 11 | 91.8 | 20.4 | 70.2 | 12.0 | −3 | 19.5 |
| 12 | 90.8 | 20.8 | 70.8 | 11.2 | 0 | 18.8 | obtaining a high toughness and a high creep rupture strength. The tempering temperature is preferably in a range of 610 to 700° C. for obtaining a high toughness and a high creep rupture strength.

As for the tensile test, impact test, and notching creep rupture test, the toughness is expressed by a V-notch Charpy impact absorption energy tested at 20° C. The creep rupture strength-is expressed by a $10^5$ h strength (at 538° C.) obtained by the Larsson-Miller method. As is apparent from the table, the material of the present invention exhibits a tensile strength at room temperature in a range of 88 kg/mm² or more; 0.2% proof stress in a range of 70 kg/mm² or more; a FATT in a range of 40° C. or less; the impact absorption energy (before and after heating) in a range of 2.5 kg-m or more; and a creep rupture strength in a range of about 12 kg/mm² or more, and is very useful for the high pressure-intermediate pressure-low pressure integral type turbine rotor. In particular, the material having a strength of about 15 kg/mm² or more is suitable for a turbine rotor on which 33.5 inch long-blades are planted.

Further, by setting the ratio Ni/Mo in a range of 1.25 or more and the ratio Cr/Mo in a range of 1.1 or more, or setting the ratio Cr/Mo in a range of 1.45 or more and the ratio Cr/Mo in a range of a value defined by $[-1.11 \times (Ni/Mo) + 2.78]$, there can be obtained an advantage in which the material heat-treated entirely under the same condition exhibits $10^5$ h creep rupture strength (at 538° C.) of 12 kg/mm² or more.

Figure 10:
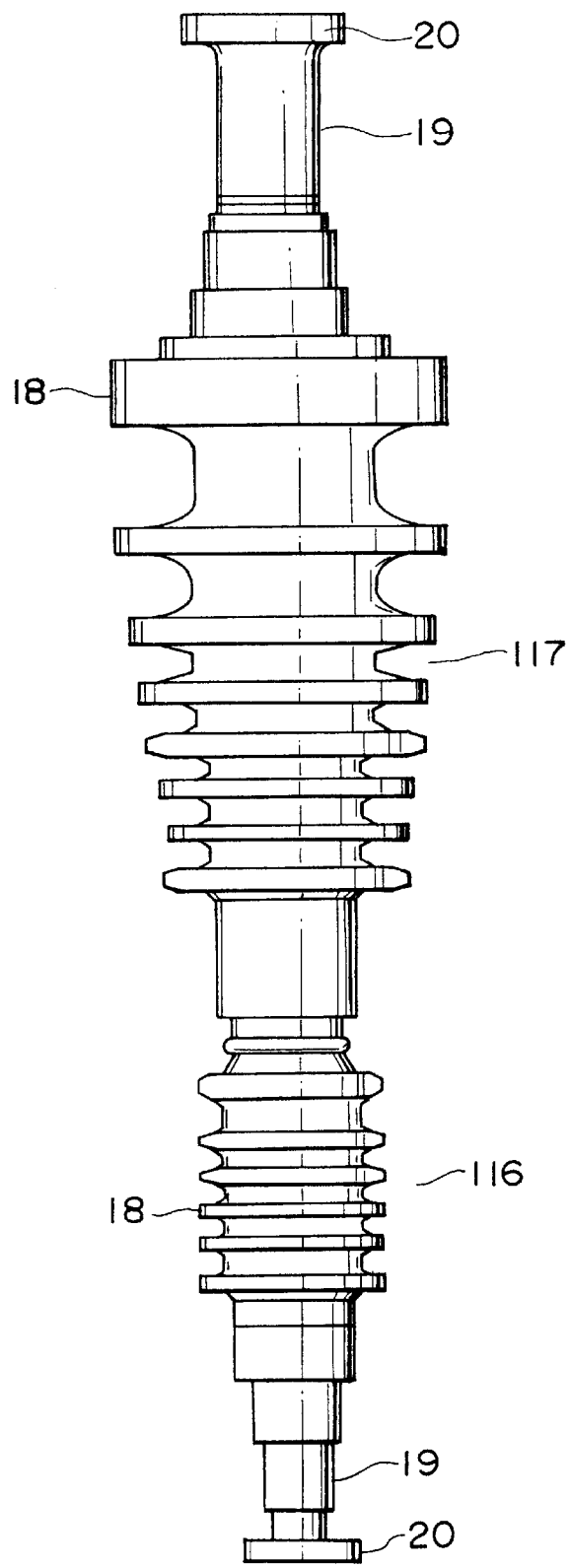
FIG. 10 is a plan view of a rotor shaft for the high pressure-intermediate pressure-low pressure integral type steam turbine.

FIG. 10 shows a shape of the high pressure-intermediate pressure-low pressure integral type rotor shaft of the present invention. The rotor shaft in this embodiment was produced as follows. First, a forged steel having an alloy composition shown in Table 7 was melted in an arc melting furnace, being poured in a ladle and refined in vacuum by blowing Ar gas from the lower portion of the ladle, and cast in a mold. The casting was then forged at a temperature ranging from 900 to 1150° C. into a shape having the maximum diameter of 1.7 m and the length of about 8 m. The forged rotor thus obtained was quenched by heating a high pressure side 16 at 950° C. for 10 hr and an intermediate pressure-low pressure side 17 at 880° C. for 10 hr, and cooling it by water atomization or dipping it in water while rotating the shaft so as to keep a cooling rate of 100° C./h at the center portion. The rotor thus quenched was tempered by heating the high pressure side 116 at 650° C. for 40 hr and the intermediate pressure-low pressure side 117 at 625° C. for 40 hr. Test pieces were cut off from the center portion of the rotor shaft thus obtained and were subjected to a creep rupture test, a V-notch impact test (cross-section of test piece: 0.8 cm²), and a tensile test. The test results are shown in Table 8.

Referring to FIG. 10, the axial width and the gap at each blade planting portion 18 of each of the high pressure side 116 and the intermediate pressure-low pressure side 117 are as described above. Reference numeral 19 designates a bearing portion, and 20 designates a coupling.

TABLE 8

|  | high pressure portion | low pressure portion |
|---|---|---|
| tensile strength (kg/mm²) | | |
| R.B. | ≧77.3 | ≧87.8 |
| C.C. | ≧73.8 | ≧87.8 |
| 耐力 (kg/mm²) | | |
| R.B. | ≧59.7 | ≧72.0 |
| C.C. | ≧56.2 | ≧72.0 |
| elongation (%) | | |
| R.B. | ≧14 | ≧17 |
| L.B. | ≧17 | ≧17 |
| C.C. | ≧14 | ≧17 |
| reduction (%) | | |
| R.B. | ≧40 | ≧50 |
| L.B. | ≧45 | ≧50 |
| C.C.(L.B.) | ≧40 | ≧50 |
| impact value (kg-m) | | |
| R.B. | ≧0.82 | ≧6.22 |
| C.C.(R.B.) | ≧0.69 | ≧4.83 |
| transition temperature (° C.) | | |
| R.B. | ≦121 | ≦−1.0 |
| C.C.(R.B.) | ≦135 | ≦10 |
| creep rupture strength | | |
| 550° C., 30 kg/mm² | ≧186 h | |
| 600° C., 20 kg/mm² | ≧394 h | |
| 645° C., 10 kg/mm² | ≧690 h | |
| heat treatment | | |
| Hardening | 950° C. ± 10° C. air-blast quenching | 880° C. ± 10° C. water-atomize quenching |
| tempering | ≧648° C. | ≧590° C. |

At the high pressure portion, the diameters of the rotating blade portions in respective stages are identical to each other, and also the diameters of the stationary blade (nozzle) portions in respective stages are identical to each other. In a region from the intermediate pressure portion to the low pressure portion, the diameter of the blade portion becomes larger. At the intermediate pressure portion, the diameters of the nozzle portions are identical to each other in a region from the first stage to fourth stage, in a region from the fourth stage to sixth stage, and in a region from the sixth stage to eight stage, respectively; and the diameter of the nozzle portion becomes large stepwise in the direction from the front stage side to the rear stage side.

The axial width of the final blade planting portion may be set at 0.3 time, preferably, 0.28–0.35 time the length of the blade portion.

For the rotor shaft, the diameter of the final stage blade portion is largest, which is preferably set at 1.72 times, at least, 1.60–1.85 times the length of the blade portion.

The length between the bearing portions is preferably set at 1.65 times, at least, 1.55–1.75 times the diameter between the leading end of the blade portions of the final stage blade.

TABLE 7

| C | Si | Mn | P | S | Ni | Cr | Mo | V | Fe |
|---|---|---|---|---|---|---|---|---|---|
| 0.23 | 0.01 | 0.20 | ≦0.005 | ≦0.005 | 1.80 | 2.01 | 1.20 | 0.27 | bal. |

(Sn ≦ 0.010, Al ≦ 0.008, Cu ≦ 0.10, Sb ≦ 0.005, As ≦ 0.008, $O_2$ ≦ 0.003)

In this embodiment, the generator allows power generation of 100,000–200,000 KW. The distance between the bearings 32 of the rotor shaft in this embodiment is about 520 cm; the diameter of the rotor shaft at the final stage blade is 316 cm; and the ratio of the distance between the bearings to the diameter is 1.65. The length between the bearings is 0.52 m per a power of 10,000 KW.

In this embodiment, the diameter of the rotor shaft becomes 365 cm in the case of using the final stage blade of 40 inches, and the ratio of the distance between the bearings to the diameter becomes 1.43. With this configuration, the generator allows a power generation of 200,000 KW. That is to say, the distance between the bearings per 10,000 KW becomes 0.26 m.

The ratio of the blade planting portion of the rotor shaft to the length of the final stage blade is 1.70 for the 33.5" blade, and 1.71 for the 40" blade.

This embodiment can be applied to the case of the steam temperature of 566° C., and is also applied to the case of the steam pressure of 121, 169 or 224 atg.

To increase the power per unit turbine, it is required to increase the blade length of the final stage blade thereby increasing the flow rate of steam. For example, in the case of using the long final stage blade of 33.5 inches over 26 inches, the annular band area is increased by about 1.7 times, so that the conventional power, 100 MW can be increased to 170 MW. Further, by using the long-blade of 40 inches, the power per unit turbine can be increased by two times or more.

In the case of using the long-blade of the class of 35 inches to 40 inches, it may be desirable to use a material having a tensile strength of 88 kg/mm$^2$ or more.

Further, a material used for the high pressure-intermediate pressure-low pressure integral type steam turbine rotor having long-blades of 30 inches or more preferably has a $10^5$ h creep rupture strength (at 538° C.) of 15 kg/mm$^2$ or more-to ensure the safety against the high-temperature breakage on the high temperature side, and preferably has an impact absorption energy (at room temperature) of 2.5 kg-m/cm$^2$ or more, particularly, 3 kg-m/cm$^2$ or more to ensure the safety against the brittle fracture on the low pressure side.

The rotor shaft can be quenched in accordance with the following processes:

(A) A method (uniformly heating-differential cooling) performed by uniformly heating each material at 940° C.; and cooling, a portion equivalent to a high pressure portion and an intermediate portion for a steam turbine of eighteen stages or a high pressure portion for a steam turbine of fourteen stages, at a cooling rate of 25° C./h determined by simulating a cooling rate in the case of forcedly air-cooling the center portion of an actual turbine rotor material, and cooling, a low pressure portion or a portion equivalent to an intermediate pressure-low pressure portion, at a cooling rate of 50° C./h determined by simulating a cooling rate in the case of cooling the center portion of an actual turbine rotor material by water spraying or dipping in water, thereby quenching the material while cooling the different portions of the material at the different cooling rates.

(B) A method (differential heating-uniformly cooling) performed by heating the above portion equivalent to the high pressure portion and the intermediate portion or the above high pressure portion at 970° C. and heating the above low pressure portion or the above portion equivalent to the intermediate pressure-low pressure portion at 930° C.; and quenching the material at a cooling rate determined by simulating a cooling rate of 50° C./h in the case of cooling the actual turbine rotor material by water spraying or dipping in water.

(C) A method (differential heating-differential cooling) performed by heating the portion equivalent to the high pressure portion and the intermediate portion or the high pressure portion at 970° C. and heating the low pressure portion or the portion equivalent to the intermediate pressure-low pressure portion at 930° C., like the method (A); and quenching the material by cooling, the portion equivalent to the high pressure portion and the intermediate portion or the high pressure portion, at a cooling rate of 25° C./h determined by simulating a cooling rate in the case of forcedly air-cooling the center portion of an actual turbine rotor material, and cooling, the low pressure portion or the portion equivalent to the intermediate pressure-low pressure portion, at a cooling rate of 50° C./h determined by simulating a cooling rate in the case of cooling the center portion of an actual turbine rotor material by water spraying.

The material can be quenched by dipping the material in a water bath and stirring water in the water bath. The material having been quenched is subjected to tempering at 650° C. for 20 hr.

From the material test of the steel samples after heat-treatment, it was confirmed that as compared with the conventional material, the inventive material is improved in high-temperature creep at the high pressure portion and in toughness at the low pressure portion. Further, of the three heat-treatment methods (A), (B) and (C), the method (B) (differential heating-uniform heating) can exhibit the most significant effect.

(2) Blade

Each of the three stages on the high temperature-high pressure side, having the length of about 40 mm, is made from a forged martensite steel containing, on the weight basis, 0.20–0.30% of C, 10–13% of Cr, 0.5–1.5% of Mo, 0.5–1.5% of W, 0.1–0.3% of V, 0.5% or less of Si, and 1% or less of Mn, the balance being Fe.

The length of the blade at the intermediate pressure portion becomes larger toward the low pressure side. The blade is made from a forged martensite steel containing, on the weight basis, 0.05–0.15% of C, 1% of or less of Mn, 0.5% or less of Si, 10–13% of Cr, 0.5% or less of. Mo, and 0.5% or less of Ni, the balance being Fe.

The final stage blade having the blade portion length of 35 inches for 60 cycle has about 90 blade pieces around a circle, and is made from a forged martensite steel containing, on the weight basis, 0.08–0.18% of C, 1% or less of Mn, 0.25% or less of Si, 8–13% of Cr, 2.0–3.5% of Ni, 1.5–3.0% of Mo, 0.05–0.35% of V, 0.02–0.10% of N, and 0.02–0.20% of at least one kind or more of Nb and Ta. In particular, according to this embodiment, the alloy equivalent to Sample No. 2 shown in Table 1 in the first embodiment was used. At the final stage, an erosion preventive shield plate made from stellite is welded at the leading edge of the blade. Further, a portion, other than the shield plate is quenched. A blade having a blade portion length of 43 inches or more for 50 cycle is made from the same forged martensite steel.

In these blades, at each stage, four or five pieces of blade pieces are fixed by a shroud plate made from the same material by means of caulking of projecting tenon bars provided at the leading ends thereof.

Table 9 shows chemical compositions (wt %) of 12% Cr steels used for the high pressure-low pressure integral type steam turbine. Sample Nos. 1 to 6 were each produced by melting 150 kg of an ingot in a vacuum high frequency induction furnace, casting the molten metal in a mold, and forging the casting thus obtained at 1150° C. Sample No. 1 was heated at 1000° C. for 1 hr and cooled to room temperature by oil-quenching (cooling rate: 100° C./min or more); and then heated at 570° C. for 2 hr and air-cooled to room temperature. Sample No. 2 was heated at 1050° C. for 1 hr and cooled to room temperature by oil-quenching; and then heated at 570° C. for 2 hr and air-cooled to room temperature. Each of Sample Nos. 3 to 7 was heated at 1050° C. for 1 hr and cooled to room temperature by oil-quenching; and then heated at 560° C. for 2 hr and air-cooled to room temperature (primary tempering), and further heated at 580° C. for 2 hr and furnace-cooled to room temperature (secondary tempering).

is obtained. The (Ni—Mo) amount is preferably in a range of 0.1 to 0.5%.

The effect of the heat-treatment conditions (quenching temperature and secondary tempering temperature) exerted on the tensile strength and impact value of Sample No. 3 is as follows: namely, by heat-treating Sample No. 3 at the quenching temperature ranging from 975 to 1125° C., the primary tempering temperature ranging from 550 to 560° C., and the secondary tempering temperature ranging from 560 to 590° C., Sample No. 3 satisfies the characteristics nec-

TABLE 9

| No. | C | Si | Mn | Cr | Ni | Mo | W | V | Nb | N | Ni − Mo | $\frac{Nb}{C}$ | C + Nb | $\frac{Nb}{N}$ | $\frac{V}{C + \frac{Nb}{2}}$ |
|---|---|---|---|---|---|---|---|---|---|---|---|---|---|---|---|
| 1 | 0.12 | 0.15 | 0.75 | 11.5 | 2.60 | 1.70 | — | 0.36 | — | 0.03 | 0.90 | — | — | — | 0.30 |
| 2 | 0.28 | 0.28 | 0.71 | 11.6 | 0.73 | 1.10 | 1.12 | 0.21 | — | 0.04 | — | — | — | — | — |
| 3 | 0.14 | 0.04 | 0.16 | 11.4 | 2.70 | 2.10 | — | 0.26 | 0.08 | 0.06 | 0.60 | 0.57 | 0.22 | 1.33 | 0.350 |
| 4 | 0.13 | 0.04 | 0.15 | 11.5 | 2.50 | 2.40 | — | 0.28 | 0.10 | 0.05 | 0.10 | 0.77 | 0.23 | 2.0 | 0.370 |
| 5 | 0.13 | 0.06 | 0.15 | 11.4 | 2.65 | 3.10 | — | 0.25 | 0.11 | 0.06 | −0.45 | 0.85 | 0.22 | 1.83 | 0.365 |
| 6 | 0.14 | 0.04 | 0.17 | 11.4 | 2.61 | 3.40 | — | 0.26 | 0.10 | 0.06 | −0.79 | 0.71 | 0.24 | 1.67 | 0.370 |
| 7 | 0.14 | 0.04 | 0.30 | 11.5 | 2.60 | 2.30 | — | 0.27 | 0.10 | 0.07 | 0.30 | 0.71 | 0.24 | 1.43 | 0.375 |

In Table 9, Sample Nos. 3, 4 and 7 are inventive materials; Sample Nos. 5 and 6 are comparative materials; and Sample Nos. 1 and 2 are current long-blade materials.

Table 10 shows mechanical properties (at room temperature) of these samples. The inventive materials (Sample Nos. 3, 4 and 7) each sufficiently satisfy the tensile strength (120 kgf/mm² or more or 128.5 kgf/mm² or more), low temperature toughness (V-notch charpy impact value at 20° C.: 4kgf-m/cm² or more) necessary for the long-blade material for the steam turbine.

On the contrary, the comparative materials (Sample Nos. 1, 5 and 6) each do not satisfy at least one of the tensile strength and impact value necessary for the long-blade material of the steam turbine. The comparative material (Sample No. 2) is low in both the tensile strength and toughness. Sample No. 5 is as slightly low as 3.8 kgf-m/cm²), which is slightly lower than the necessary value, 4 kgf-m/cm² or more for the long-blade of 43".

TABLE 10

| No. | tensile strength (kgf/mm²) | elongation (%) | reduction (%) | impact value (kgf-m/cm²) |
|---|---|---|---|---|
| 1 | 114.4 | 19.0 | 60.1 | 8.0 |
| 2 | 114.6 | 18.6 | 59.7 | 1.2 |
| 3 | 132.5 | 21.0 | 67.1 | 5.2 |
| 4 | 134.9 | 20.8 | 66.8 | 4.8 |
| 5 | 137.0 | 18.5 | 59.8 | 3.8 |
| 6 | 118.7 | 21.1 | 67.3 | 5.2 |
| 7 | 133.5 | 20.1 | 60.4 | 5.1 |

In this embodiment, the strength and toughness at a low temperature are improved by adding Ni and Mo in equal amounts. As the difference between the contents of Ni and Mo becomes large, the strength becomes smaller. When the Ni content becomes smaller than the Mo content by 0.6% or more, the strength is significantly reduced. Even when the Ni content becomes larger than the Mo content by 1.0% or more, the strength is significantly reduced. By adjusting the (Ni-Mo) amount in a range of −0.6 to 1.0%, a high strength can be obtained. When the (Ni—Mo) amount is near −0.5%, the impact value is reduced; however, when the (Ni—Mo) amount is less than or more than −0.5%, a high impact value essary for the long-blade material (tensile strength≧128.5 kgf/mm², notching Charpy impact value at 20° C.≧4 kgf-m/cm²).

The composition of the 12% Cr steel of the present invention is preferably configured such that the (C+Nb) amount is in a range of 0.18 to 0.35%, the ratio (Nb/C) is in a range of 0.45 to 1.00, the ratio (Nb/N) is in a range of 0.8–3.0, and the (C+Nb) amount is preferably in a range of 0.19 to 0.29%, more preferably, 0.21 to 0.27% or (C+V/2+Nb) amount is in a range of 0.33 to 0.43, preferably, 0.35 to 0.41%.

All of the samples have full-temper martensite structures, and the average grain size of each sample is in a range of 5.5 to 6.0 in grain number (GSNo.). Further, the ratio (Nb/C) is preferably in a range of 0.5 to 1.0, and the ratio (Nb/N) is preferably in a range of 1.3 to 2.0. The ratio (Mn/Ni) is preferably in a range of 0.11 or less, more preferably, 0.04 to 0.10.

On the basis of the diagram showing the relationship between the 0.02% proof stress and the tensile strength, the material of the present invention is preferably specified such that the 0.2% proof stress (y) is not less than a value obtained by adding 0.5×tensile strength (x) to 36.0. On the basis of the diagram showing the relationship between the 0.2% proof stress and the 0.02% proof stress, the material of the present invention is preferably specified such that the 0.2% proof stress (y) is not less than a value obtained by adding 0.54×0.02% proof stress (x) to 58.4.

Figure 11:
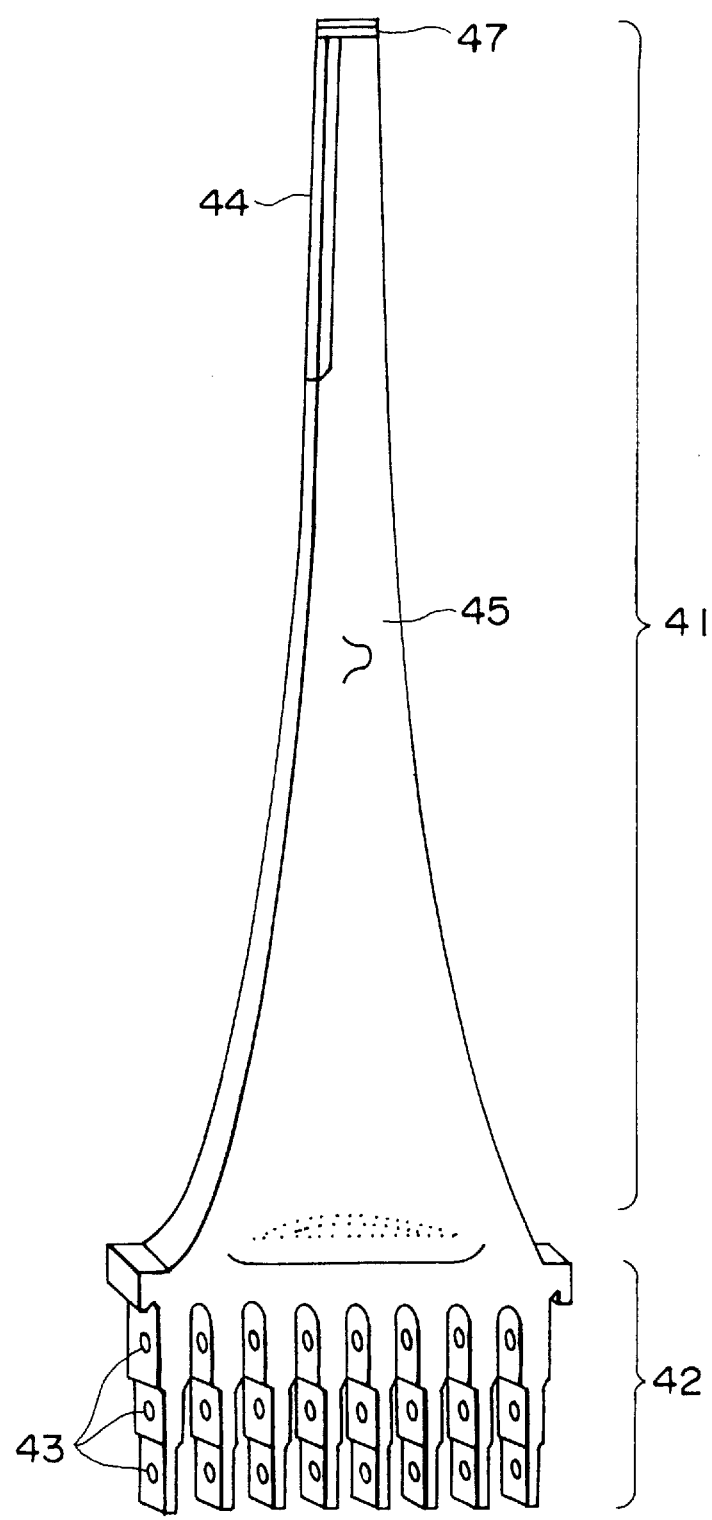
FIG. 11 is a perspective view of a long blade for the steam turbine.

FIG. 11 is a perspective view of a final stage blade having a blade portion length of 1092 mm (43"). Reference numeral 41 designates a blade portion on which high speed steam is impinged; 42 is a planting portion to a rotor shaft; 43 is a pin hole in which a pin for supporting the centrifugal force of the blade is inserted; 44 is an erosion shield for preventing erosion due to water droplets in steam (obtained by welding a stellite plate made from a Co-based alloy to the blade); and 47 is a cover. The blade is obtained from an integral forged product by cutting. The cover 47 can be mechanically, integrally formed.

The 43" long-blade was obtained by melting a material by electro-slag remelting process, casting it in a mold, forging the casting thus obtained, and heat-treating the forged product. The forging was performed at a temperature ranging from 850–1150° C. The heat-treatment was performed under the conditions described in the first embodiment (quenching: 1050° C., primary tempering: 560° C., secondary tempering: 580° C.). Sample No. 7 in Table 9 shows the chemical composition (wt %) of this long-blade material, which has a full-temper martensite structure.

Table 9 shows the tensile strength (room temperature) and V-notch Charpy impact value (at 20° C.) of Sample No. 7. The mechanical properties of the 43" inch long-blade sufficiently satisfies the necessary characteristics (tensile strength: 128.5 kgf-m/mm² or more, V-notch Charpy impact value (at 20° C.): 4 kgf-m/cm² or more).

Figure 12:
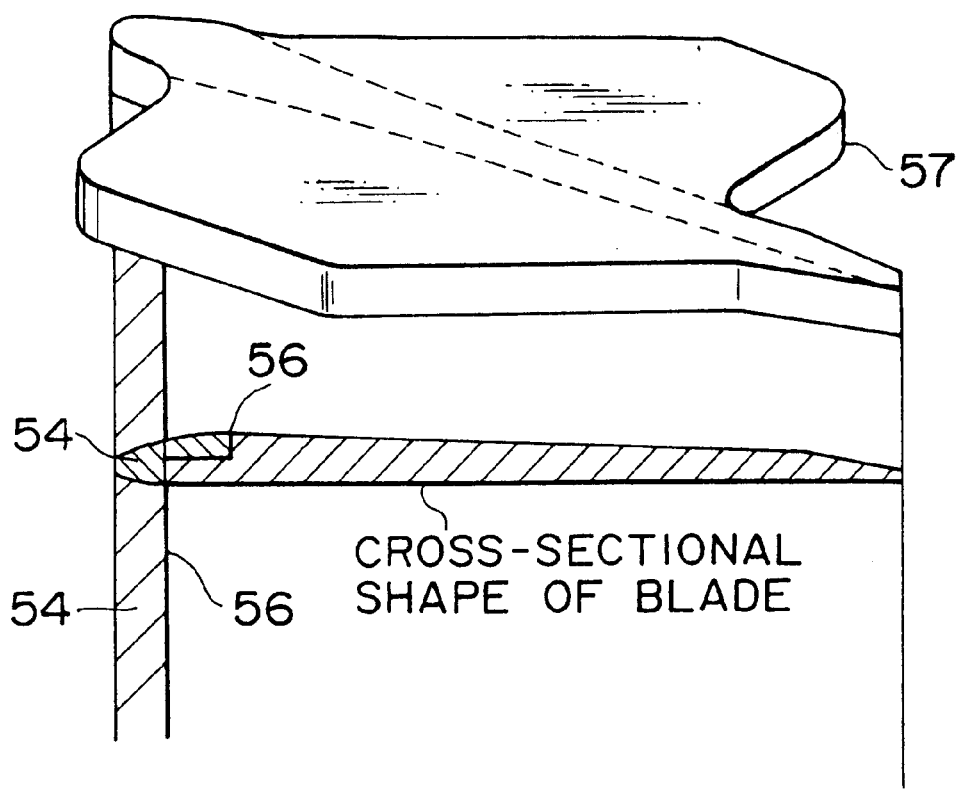
FIG. 12 is a perspective view of an erosion shield joint structure for the long blade for the steam turbine.

FIG. 12 is a perspective view, with parts partially cutaway, showing a state in which the erosion shield 44 (made from a stellite alloy containing, on the weight basis, 1.0% of C, 0.6% of Si, 0.6% of Mn, 28% of Cr, 1.0% of W, the balance being Co) in this embodiment is joined by electron beam welding or TIG welding 56. As is shown in the figure, the erosion shield 44 is welded at two points on the front and back surface sides. A continuous cover 57 is provided at the leading end of the blade in such a manner as to be integrated therewith.

TABLE 11

| portion | tensile strength (kgf/mm²) ≧128 | 0.2% proof stress (kgf/mm²) ≧88 | elongation (%) ≧13 (L) | reduction (%) ≧30 | impact value (kgf-m) ≧3.45 | FATT (° C.) | fatigue limit (kgf/mm²) | fatigue limit tensile strength |
|---|---|---|---|---|---|---|---|---|
| dovetail | 132 | 37 | 16.7 | 85 | 8.8 | −14 | 69 | 0.52 |
| blade profile root | 132 | 98 | 16.2 | 67 | 9.5 | −22 | 74 | 0.56 |

Table 11 shows the mechanical properties of the long-blade material at 25° C.

(3) each of the stationary blades (nozzles) in three stages on the high pressure side is made from a martensite steel having the same composition as that of the martensite steel used for the blade. The nozzles at the other stages are each made from the same material as that used for the blades at the intermediate pressure portion.

(4) The casing has an inner casing 14 and an outer casing 15. The inner casing is made from a Cr—Mo—V steel containing, on the weight basis, 0.15 to 0.3% of C, 0.15% or less of Si, 1% or less of Mn, 1–2% of Cr. 0.5–1.5% of Mo, 0.05–0.2% of V, and 0.1% or less of Ti.

The generator allows power generation of 100,000–200,000 KW. The distance between the bearings 62 of the rotor shaft in this embodiment is about 520 cm; the diameter of the rotor shaft at the final stage blade is 316 cm; and the ratio of the distance between the bearings to the diameter is 1.65. The power generation capacity reaches 100,000 KW. The length between the bearings is 0.52 m per a power of 10,000 KW.

In this embodiment, the diameter of the rotor shaft becomes 365 cm in the case of using the final stage blade of 40 inches, and the ratio of the distance between the bearings to the diameter becomes 1.43. With this configuration, the generator allows a power generation of 200,000 KW. That is to say, the distance between the bearings per 10,000 KW becomes 0.26 m.

The ratio of the blade planting portion of the rotor shaft to the length of the final stage blade is 1.70 for the 33.5" blade, and 1.71 for the 40" blade.

According to this embodiment, since the structural members of the rotating portion are all made from ferrite steels having a small thermal expansion coefficient, and the member for supporting the turbine nozzles and compressor nozzles are all made from ferrite steels having the same thermal expansion coefficient, it is possible to readily keep up with start-up and stoppage of the turbine, and hence to enhance the heat efficiency.

In this embodiment, there can be obtained a combined power generation plant including the above-described gas turbine uniaxially connected to the above-described steam turbine, which plant exhibits a heat efficiency of 50% or more in HHV.

This embodiment can be applied to the case of the steam temperature of 566° C. and also applied to the case of the steam pressure of 121, 169, or 224 atg.

Second Embodiment

Figure 13:
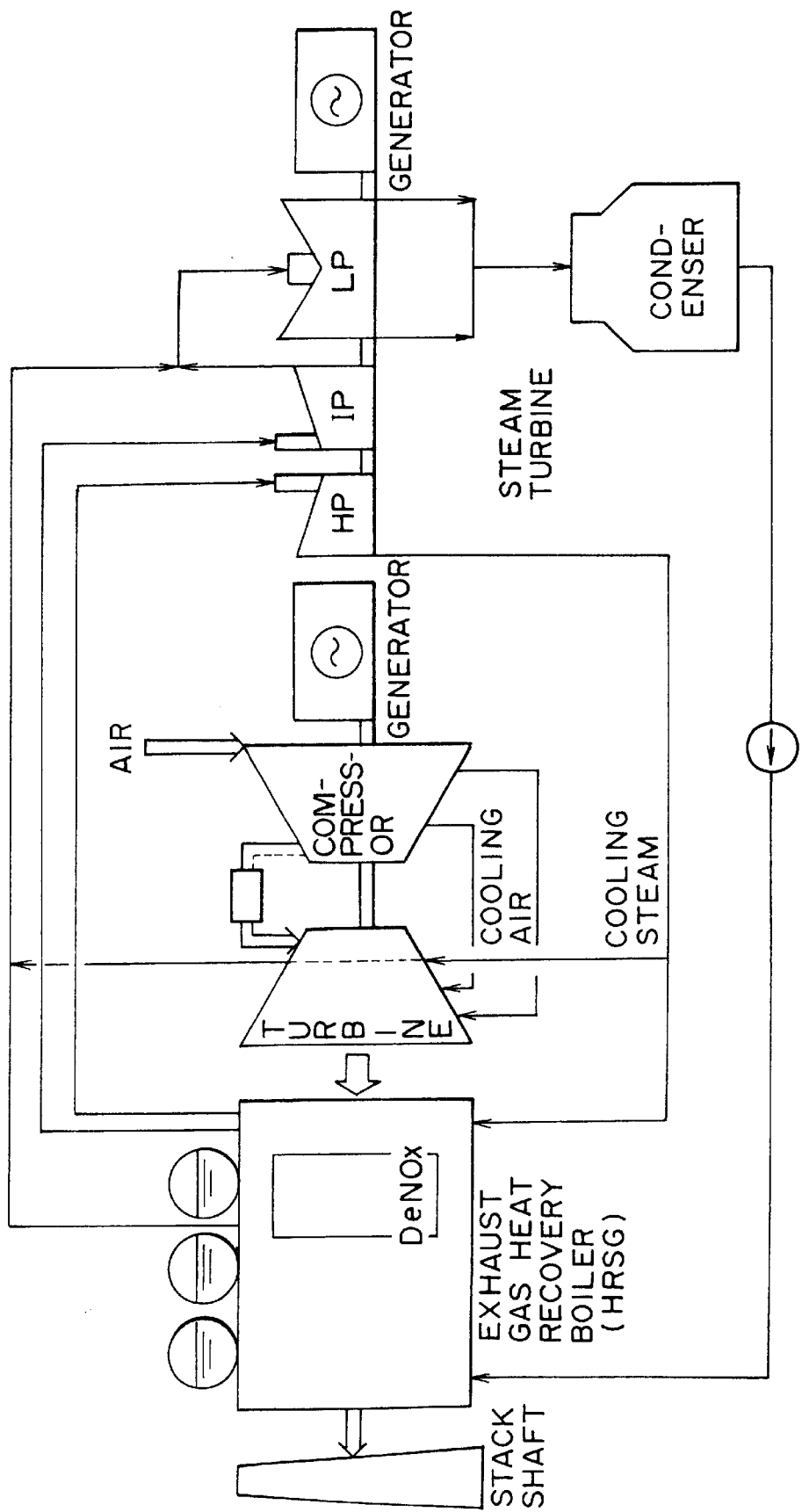
FIG. 13 is a sectional view of a rotating portion of a gas turbine by air cooling.

FIG. 13 shows a cross-sectional structure of a turbine upper half of an air compressed type three stage turbine having a closed type air cooling system in place of steam cooling described in the first embodiment. The basic structure and material configuration of the turbine structure in this embodiment are substantially the same as those in the first embodiment.

The air cooling system in this embodiment will be described below. Each of a first stage blade 51 and a second stage blade 52 has the same cooling passage as that for steam cooling in the first embodiment, and each of a second nozzle 82 and a third stage nozzle 83 has the same cooling passage as that in the first embodiment. Like the first and second stage blades, the first stage nozzle is cooled by air which is compressed, being extracted from the inner side of a casing 80, and cooled by a cooler 67 and compressed by a booster 65. The air, which has cooled the first stage nozzle 81 and the first and second stage blades 51 and 52, is released in the casing 80.

The combustion gas discharged from the turbine portion is supplied to an exhaust gas heat recovery boiler (HRSG) for producing steam.

The first stage nozzle 81 in this embodiment has cooling holes, and has a cooling structure in which cooling air flows in the nozzle from the outer peripheral side wall, passing through a plurality of cooling holes provided in vanes, and is released from the inner peripheral side wall into the casing 80.

According to this embodiment, turbine disks 11 and 12, a turbine stub shaft, and a turbine stacking bolt are each made from the same full-temper martensite steel used in the first embodiment. On the other hand, a turbine disk 13 is made from a heat-resisting steel having a full-temper martensite steel structure, which contains, on the weight basis, 0.05–0.2% of C, 0.5% or less of Si, 1% or less of Mn, 8–13% of Cr, 3% or less of Ni, 1.5–3% of Mo, 0.05–0.3% of V, 0.02–0.2% of Nb, and 0.02–0.1% of N, the balance being substantially Fe. The composition of the heat-resisting steel is concretely the same as that shown in Table 10 in the fifth embodiment. As will be described later, the material has a $10^5$ h creep rupture strength (at 450° C.) of 50 kgf/mm or more, and V-notch Charpy impact value (at 20° C.) of 7 kgf-m/cm or more, and therefore, it sufficiently satisfies the strength necessary for the high-temperature gas turbine material. The martensite steel has a ferrite based crystal structure. The ferrite based material has a thermal expansion coefficient smaller than that of an austenite based material such as an Ni-based alloy. This embodiment, in which the turbine disk is not made from an Ni-based alloy but made from a heat-resisting steel, is capable of enhancing the heat efficiency, and also reducing thermal stress applied to the disk because of the small thermal expansion coefficient of the disk material, thereby suppressing occurrence of cracks and breakage. The structure and material configuration of the other portions are the same as those in the first embodiment.

A compressor having blades arranged in seventeen stages is designed to obtain an air compression ratio of 18. The fuel used for the compressor is natural gas or light oil.

With this configuration, there can be obtained a highly balanced, highly reliable gas turbine for power generation, which exhibits a power generation efficiency of 37% or more in LHV under a temperature condition in which the gas temperature at the inlet of the first stage turbine nozzle is 1500° C.; the metal temperature of the first stage turbine blade is 900° C.; and the exhaust gas temperature of the gas turbine is 650° C.

Figure 14:
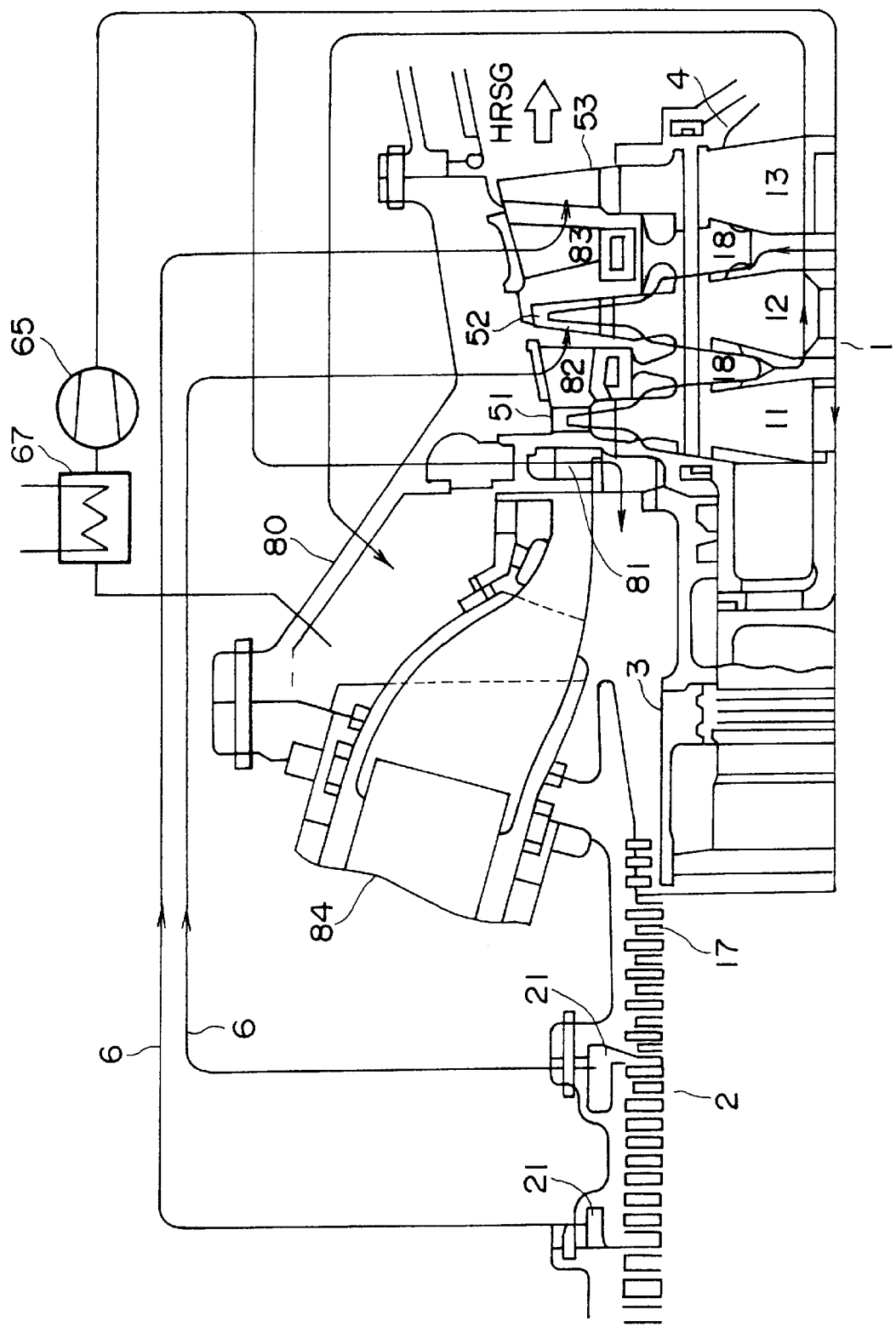
FIG. 14 is a view showing configuration of a combined power generation system by closed type air cooling.

FIG. 14 is a configuration view showing a multiaxial combined cycle power generation system including, like the first embodiment, one gas turbine provided with a generator, and a high pressure-intermediate pressure-low pressure integral type steam turbine provided with a generator. The gas turbine in this combined cycle power generation system is the same as that described above. In this gas turbine, air compressed by a compressor, passing through an air pre-cooler (I.C) and a booster compressor (B.C) for compressing the air, and is supplied to blades (rotating blades) and nozzles (stationary blades) for cooling them along the above-described cooling route. The air used for cooling is warmed and is used for a combustor. According to this embodiment, the combustion gas temperature is set at 1500° C. or more and the exhaust gas temperature is set at 600° C. or more. Further, as described above, steam having a temperature of 530° C. or more is generated by an exhaust gas heat recovery boiler (HRSG) provided with a denitration apparatus (DeNOx). The steam heated at a temperature of 530° C. or more flows in a high pressure (HP) portion of the high pressure-intermediate pressure-low pressure integral type steam turbine, and flows again in the head of the HRSG from the HP portion to be re-heated at the same temperature as the inlet temperature of the HP portion. The steam thus re-heated flows in an intermediate pressure (IP) portion and a low pressure (LP) portion in sequence, entering in a condenser, and flows in a rear stage portion of the HRSG to be re-heated at a temperature of 530° C. or more. The steam thus re-heated flows again in the HP portion.

The configurations of the gas turbine and the high pressure-intermediate pressure-low pressure integral type steam turbine in this embodiment are substantially the same as those in the first embodiment. In this embodiment, the gas turbine has a power generation ability of 200,000–300,000 KW and the steam turbine has a power generation ability of 100,000–200,000 KW; and the plant exhibits the heat efficiency of 50% or more in HHV as a whole. Further, by using a plurality of gas turbines and steam turbines, it is possible to obtain a power generation of 700,000–1,000,000 KW as a whole. The system in this embodiment is of a multiaxial type; however, the present invention can be applied to a system in which the gas turbine and the steam turbine are uniaxially connected to each other and the power generation is performed by one generator. The materials in this embodiment can be used to the steam temperatures of 538° C. (1000° F.) and 566° C. (1050° F.). As the material of the high pressure-intermediate pressure-low pressure integral type rotor shaft used for the steam temperature of 593° C. (1100° F.), a martensite steel containing 8–12.5 wt % of Cr used for the turbine disk according to the present invention is preferably used.

The gas turbine in this embodiment is of the three stage type gas turbine; however, a four stage type gas turbine can be similarly combined with the steam turbine in this embodiment. In the case of adopting the four stage type gas turbine, first and second stage blades and nozzles may be made from the same materials as those of the first and second blades and nozzles in this embodiment and are cooled in the same manner as that used for the first and second stage blades and nozzles in this embodiment, and the third and fourth stage blades and nozzles may be made from the same materials as those of the third stage blade and nozzle and are cooled in the same manner as that used for the third stage blade and nozzle.

According to this embodiment, like the first embodiment, the gas turbine can be rapidly started and stopped to obtain a high heat efficiency, and the combined power generation system exhibits a heat efficiency of 50% or more in HHV.

Third Embodiment

Figure 15:
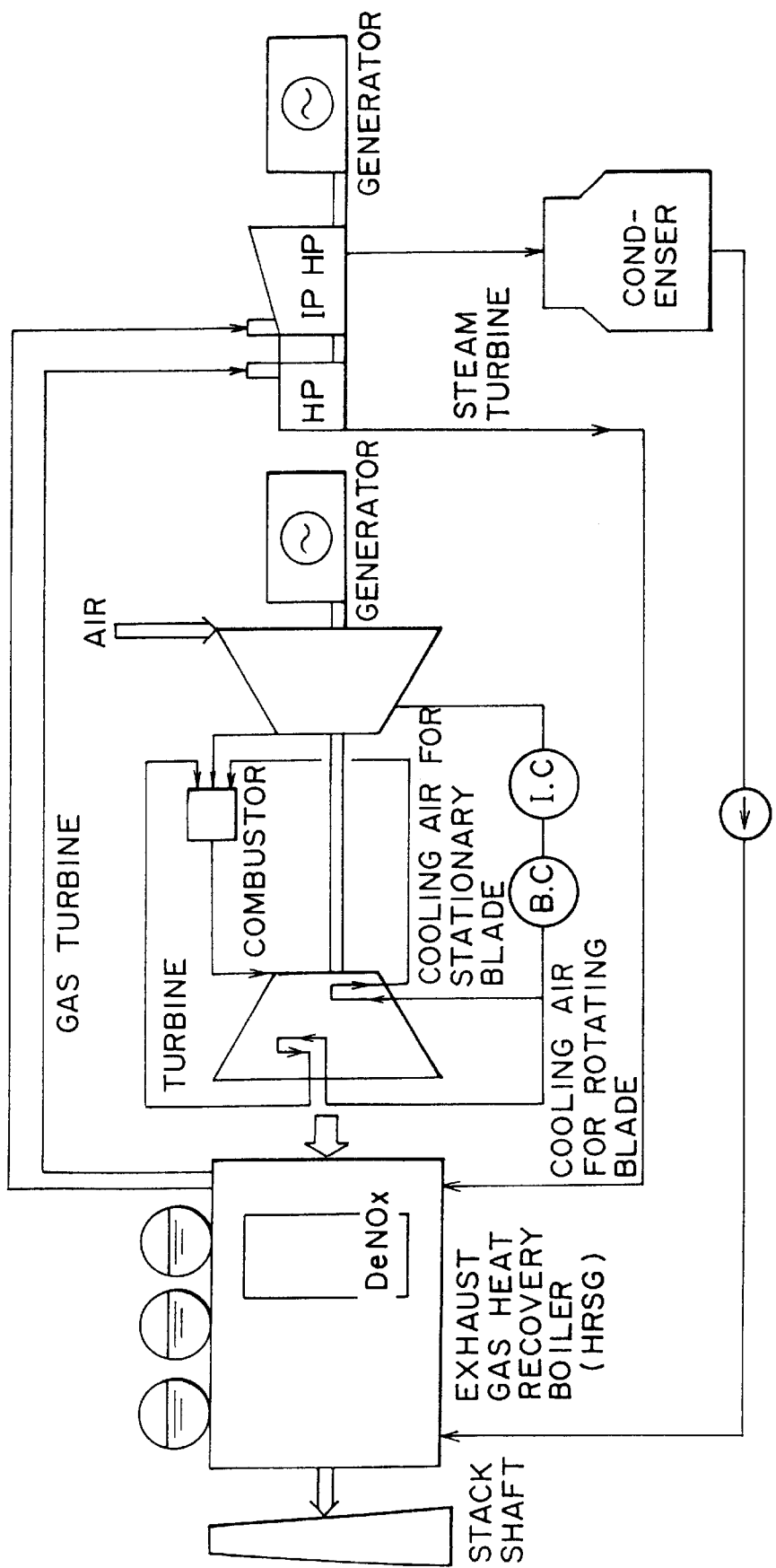
FIG. 15 is a view showing configuration of a combined power generation system by steam cooling.

FIG. 15 is a configuration view of a combined cycle power generation system including a gas turbine characterized in which, as described above, exhaust gas discharged from the gas turbine is supplied to an exhaust gas heat recovery boiler (HRSG) for generating steam, and the gas turbine is cooled by the steam; and a steam turbine divided into a high pressure (HP) steam turbine, an intermediate pressure (IP) steam turbine, and a low pressure (LP) steam turbine. This embodiment is different from the first embodiment in that the steam turbine is divided into the high pressure, intermediate pressure and low pressure steam turbines; and the high pressure portion and the intermediate portion have an integral rotor shaft and the low pressure portion has a rotor shaft having another composition. The steam temperature at the inlet of the HP is the same as that at the inlet of the IP, which is set at 538 or 566° C., and the steam temperature at the inlet of LP is set at about 300° C. The steam discharged from the HP is heated by the exhaust gas heat recovery boiler, and enters in the IP. The HP and IP in the steam turbine have an uniaxial integral rotor shaft made from a material different from that of the rotor shaft of the LP. The integral rotor shaft of the HP and IP is made from a material equivalent to No. 1 in Table 3, and the rotor shaft of the LP is made from a material equivalent to No. 2 in Table 3. The final stage blade of the LP in this embodiment is, like the first embodiment, formed of a blade having a blade portion length of 43 inches and made from a 12% Cr martensite steel. The steam turbine in this embodiment has two casings; one being provided for the HP and IP and the other being provided for the LP. The steam discharged from the IP flows, together with the steam at about 300° C. discharged from the HRSG, into the central portion of the LP having the right-to-left symmetrical turbine structure. The configuration of the gas turbine in this embodiment is substantially the same as that in the first embodiment, and the powers obtained by the gas turbine and steam turbine are substantially the same as those in the first embodiment. The power generation system in this embodiment exhibits a heat efficiency of 50% or more in HHV.

Fourth Embodiment

This embodiment is different from the first, second and third embodiments in terms of the following requirements of the gas turbine.

A first stage blade 51 of the gas turbine is made from an Ni-based alloy casting having a single crystal structure containing, on the weight basis, 6–8% of Cr, 0.5–1% of Mo, 6–8% of W, 1–4% of Re, 4–6% of Al, 6–9% of Ta, 0.5–10% of Co, and 0.03–0.13% of Hf, the balance being inevitable impurity and Ni. A blade portion of the first stage blade is 130 mm, and the total length of the first stage blade is about 220 mm. The single crystal casting has a useful temperature in a service condition of $10^5$ h×14 kgf/mm$^2$ is in a range of 930 to 940° C. The first stage blade has complicated inner cooling holes through which compression air flows in the blade for cooling it upon operation, and has a closed type staggered passage cooling structure. To enhance the corrosion resistance of the blade, an alloy layer made from an alloy containing, on the weight basis, 2–5% of Al, 20–30% of Cr, 0.1–1% of Y, the balance being Ni or (Ni+Co) is formed on the surface of the blade to a thickness of 50 to 150 μm in a non-oxidized low pressure atmosphere by plasma spraying. This single crystal casting is subjected to solution treatment at a temperature ranging from 1250 to 1350° C., and then subjected to double aging treatments at a temperature ranging from 1000 to 1100° C. and at a temperature ranging from 850 to 950° C., to precipitate γ'-phase particles each having a length of one side of 1 μm or less, at a 50–70 vol %.

Each of a second stage blade 52 and a third stage blade 53 is made from an Ni-based super alloy containing, on the weight-basis, 12–16% of Cr, 0.5–2% of Mo, 2–5% of W. 2.5–5% of Al, 3–5% of Ti, 1.5–3% of Ta, 8–10% of Co, 0.05–0.15% of C, 0.005–0.02% of B, the balance being inevitable impurities and Ni. These blades each has an equi-axed structure obtained by usual casting. The second stage blade has inner cooling holes through which compressed air flows in the blade for cooling it. The above material has a useful temperature in a service condition of $10^5$ h×14 kgf/mm$^2$ is in a range of 840 to 860° C. To enhance the corrosion resistance of the blade, a diffusion coating layer made from Cr or Al is formed on the surface of the blade. Such an Ni-based alloy is subjected to the same heat-treatment as that described above.

A first stage nozzle 81 is made from an ordinary casting (equi-axed crystal structure) of a Co-based super alloy containing, on the weight basis, 24–30% of Cr, 8–12% of Ni, 6–9% of W, 0.1–0.4% of Ti, 8–10% of Co, 0.2–0.4% of C, 0.005% or less of B, 1.0% or less of Fe, 1.0% or less of Zr, 0.3% or less of Nb, 1.0% or less of Hf, and 2.0% or less of Ta, the balance being inevitable impurities and Co. The useful temperature of this alloy under a service condition of $10^5$ h×6 kgf/mm$^2$ is in a range of 900 to 910° C. The first stage nozzle is cooled by a closed type impinge cooling method. A heat insulation coating layer is provided on a portion, being in contact with flame, of the outer surface of the first stage nozzle. The heat insulating layer is formed to a thickness of 100 to 200 μm by vapor-deposition of a $Y_2O_3$ stabilized zirconium layer having a double layer structure in which fine columnar crystal particles each having a diameter of 10 μm or less are dispersed in macro columnar crystal particles each having a diameter of 50 to 200 μm. A binding layer is further formed between the base metal and the zirconium layer. The binding layer is formed by spraying an alloy material containing, on the weight basis, 2–5% of Al, 20–30% of Cr, and 0.1–1% of Y, the balance being Ni or (Ni+Co). The binding layer has an effect of improving the corrosion resistance. The above-described casting material is subjected to solution treatment at a temperature ranging from 1150 to 1200° C. and then to one stage aging treatment at a temperature ranging from 820 to 880° C.

Each of second and third stage nozzles 82 and 83 is made from an Ni-based super alloy containing, on the weight basis, 21–24% of Cr, 18–23% of Co, 0.05–0.20% of C, 1–8% of W, 1–2% of Al, 2–3% of Ti, 0.5–1.5% of Ta, and 0.05–0.15% of B, the balance being inevitable impurities and Ni. Such a nozzle has an equi-axed crystal structure obtained by usual casting. A heat insulating layer is not particularly provided on each nozzle; however, to enhance the corrosion resistance, the second stage nozzle is covered with a diffusion coating layer of Cr or Al. Each of the second and third stage nozzles has cooling holes through which compressed air flows in the nozzle for cooling it. The above Ni-based super alloy has a useful temperature under a service condition of $10^5$ h×6 kgf/mm$^2$ is in a range of 840 to 860° C. This casting material is subjected to the same heat-treatment as that described above.

In this embodiment, each of turbine disks 11 and 12 is made from the same full-temper martensite steel as that used in the first embodiment. A turbine disk 13 is made from a full-temper martensite steel containing, on the weight basis, 0.05–0.2% of C, 0.5% or less of Si, 1% or less of Mn, 3% or less of Ni, 8–13% of Cr, 1.5–3.0% of Mo, 0.05–0.3% of V, 0.02–0.10% of Nb, and 0.02–0.10% of N. The concrete example of this material is the same as that in the second embodiment, and exhibits a $10^5$ h creep rupture strength (at 450° C.) of 50 kgf/mm$^2$ or more. Accordingly, such a material sufficiently satisfies the strength necessary for the high temperature gas turbine.

A compressor having blades arranged in seventeen stages is designed to obtain an air compression ratio of 18. The fuel used for the compressor is natural gas or light oil.

With this configuration, like the previous embodiments, there can be obtained a highly balanced, highly reliable gas turbine for power generation, which exhibits a power generation efficiency of 37% or more in LHV under a temperature condition in which the gas temperature at the inlet of the first stage turbine nozzle is 1500° C.; the metal temperature of the first stage turbine blade is 920° C.; and the exhaust gas temperature of the gas turbine is 650° C., and also obtained a combined power generation plant exhibiting a high heat efficiency of 50% or more in HHV.

Fifth Embodiment

In this embodiment, a gas turbine having the following requirements is used in place of the gas turbine described in each of the first, second and third embodiments.

A first stage blade 51 of the gas turbine in this embodiment has a structure being substantially the same as that in the first embodiment, and is made from a unidirectionally solidified Ni-based super alloy casting having a columnar crystal structure. The Ni-based super alloy contains, on the weight basis, 5–16% of Cr, 0.3–2% of Mo, 2–9% of W, 2.5–6% of Al, 0.5–5% of Ti, 1–4% of Ta, 8–10% of Co, 0.05–0.15% of C, and 0.005–0.02% of B, the balance being inevitable impurities and Ni. The entire length of the first stage blade is about 220 mm. Since the useful temperature in a service condition of $10^5$ h×14 kgf/mm$^2$ of the unidirectionally solidified columnar crystal casting is in a range of 890–900° C., like the first embodiment, a heat insulating layer is provided on the first stage blade for lowering the metal temperature. The unidirectional solidification is sequentially performed in the direction from the blade portion side to the dovetail side, to entirely form a columnar crystal structure. The diameter of the columnar crystal is in a range of 2 to 10 mm, which is small at the blade portion and is increased from the shank portion. The unidirectionally solidified casting is subjected to solution treatment at a temperature ranging from 1200 to 1280° C., and then subjected to double aging treatments at a temperature ranging from 1000–1150° C. and a temperature ranging from 800 to 950° C., to precipitate γ'-phase particles each having a length of one side of 2 μm or less, at a 50–70 vol %, preferably, 60–65 vol %.

Each of second and third blades 52 and 53 is made from the same material as that described in the first embodiment.

A first stage nozzle 81 is made from the same alloy as that described in the first embodiment. A heat insulating layer having a four-layer structure including a $Y_2O_3$ stabilized zirconium thermal spraying layer, an alloy layer, a mixed layer of a ceramic material and an alloy, and an alloy layer, which are stacked from the surface portion to the base material, is formed on the first stage nozzle 81 for insulating heat, relieving thermal stress, and improving the corrosion resistance. The alloy layer is made from an alloy containing, on the weight basis, 2–5% of Al, 20–30% of Cr, 0.1–1% of Y, the balance being Ni or Ni—Co.

Each of second and third stage nozzles 82 and 83 is, like the first embodiment, made from an Ni-based super alloy containing, on the weight basis, 21–24% of Cr, 18–23% of Co, 0.05–0.20% of C, 1–8% of W, 1–2% of Al, 2–3% of Ti, 0.5–1.5% of Ta, and 0.05–0.15% of B, the balance being inevitable impurities and Ni. A heat insulating layer is not particularly provided on each of the second and third stage nozzles; however, to enhance the corrosion resistance, the second stage nozzle is covered with an alloy containing, on the weight basis 2–5% of Al, 20–30% of Cr, and 0.1–1% of Y, the balance being Ni or (Ni+Co). Each of the second and third stage nozzles has cooling holes through which compressed air flows in the nozzle for cooling it. The above Ni-based super alloy has a useful temperature under a service condition of $10^5$ h×6 kgf/mm² is in a range of 840 to 860° C.

According to this embodiment, a turbine disk 11, a turbine stub shaft 34, and a turbine stacking bolt are each made from the same martensite steel used in the first embodiment. On the other hand, each of turbine disks 12 and 13 is made from a heat-resisting steel having a full-temper martensite steel structure, which contains, like in the second embodiment, on the weight basis, 0.05–0.2% of C, 0.5% or less of Si, 1% or less of Mn, 8–13% of Cr, 3% or less of Ni, 1.5–3% of Mo, 0.05–0.3% of V, 0.02–0.2% of Nb, and 0.02–0.1% of N, the balance being substantially Fe.

A compressor having blades arranged in seventeen stages is designed to obtain an air compression ratio of 18. The fuel used for the compressor is natural gas or light oil.

The martensite steel in this embodiment has a thermal expansion coefficient smaller than that of an austenite based material such as an N-based alloy. This embodiment, in which the turbine disk is not made from an Ni-based alloy but made from a heat-resisting steel, allows high efficient power generation from the start-up because of the small thermal expansion coefficient of the disk system, and further can reduce thermal stress applied to the disk, thereby suppressing occurrence of cracks and breakage.

With this configuration, there can be obtained a highly balanced, highly reliable gas turbine. Since the gas temperature at the inlet of the first stage turbine nozzle is 1350° C.; the metal temperature of the first stage turbine blade is 850° C.; and the exhaust gas temperature of the gas turbine is 600° C., a time elapsed until stable operation is shortened. Such shortage of the time elapsed until stable operation is important to improve the heat efficiency for the gas turbine having a very large frequency of start-stop of the gas turbine.

In this embodiment, it is possible to achieve a gas turbine for power generation exhibiting a heat efficiency of 37% or more in LHV.

Further, it is possible to obtain a combined power generation system exhibiting a heat efficiency of 50% or more in HHV.

Sixth Embodiment

Figure 16:
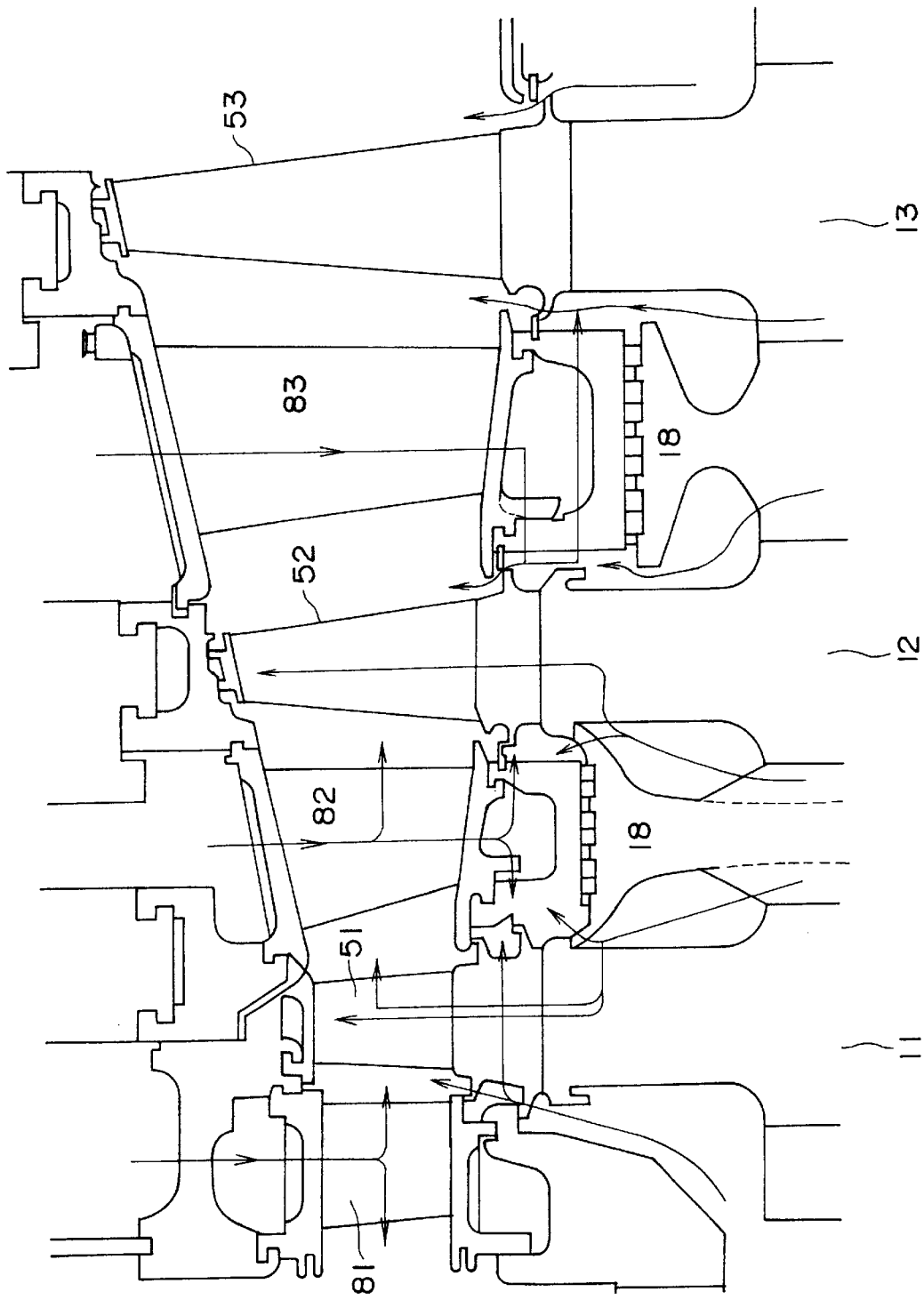
FIG. 16 is a sectional view of a rotating portion of a gas turbine by air cooling.

FIG. 16 is a sectional view of an air cooling line and a turbine rotating portion of a gas turbine of the present invention. The configuration of the turbine rotating portion is substantially the same as shown in FIG. 2. While not shown in the figure, the turbine in this embodiment mainly includes an air compressor, a combustor, and a turbine. Further, the gas turbine includes, a turbine stub shaft, turbine stacking bolts, turbine spacers, a distance piece, compressor disks, compressor blades, compressor stacking bolts, compressor stub shaft, and turbine disks. The compressor disks are arranged in seventeen stages, and the turbine blades are arranged in three stages. The present invention can be applied to a gas turbine having four stage blades.

In this embodiment, as shown by an arrow in FIG. 16, air compressed by the compressor flows for cooling respective parts of the gas turbine. In each of first and second stage nozzles 81 and 82, air flows in the nozzle from the outer peripheral side wall and flow out of the nozzle from the blade portion. The second stage nozzle is cooled over the inner peripheral side wall. In a third stage nozzle 83, air flows in the nozzle from the outer peripheral side wall, entering in the inner peripheral side wall, and is discharged to the outside from the spacer portion. In a first stage blade 51, compressed air flows from the center portion to the side wall of a turbine disk 11, passing through the spacer 18 portion and cooling holes provided in the blade, and is discharged from the leading end of the cooling holes and the trailing portion of the blade portion, to thereby cool both the blade and the disk. In the blade, air flows in such a manner as to obstruct the flow-in of the combustion gas from the seal fins. With respect to the second stage blade 52, air flows from the turbine disk 12 in the cooling holes of the blade through the spacer 18, and is discharged from the leading end of the blade, to thus cool the blade. The third stage blade 53 has no cooling hole. With respect to this blade, air flows from the center portion of the turbine disk 13 along the side wall of the blade, passing through the seal fins, and enters in the exhaust gas heat recovery boiler together with combustion gas. The exhaust gas heat recovery boiler produces steam used for the steam turbine.

The samples of the materials used for the turbine disks 11, 12 and 13 in this embodiment were each produced by melting 20 kg of a material having a composition (wt %) shown in Table 12, heating molten metal at 1150° C., and casting it. The material was heated at 1150° C. for 2 hr, and cooled to 150° C.; and heated at 580° C. for 2 hr and air-cooled (secondary tempering) and heated at 605° C. for 5 hr and furnace-cooled (secondary tempering).

A creep rupture test piece, a tensile test piece, and a V-notch Charpy impact test piece were taken from the material after heat-treatment. The impact test was carried out by using a material previously embrittled by heating at 500° C. for 1000 hr. The embrittled material is equivalent to a sample heated at 450° C. for $10^5$ hr on the basis of a parameter of Larsson-Miller.

TABLE 12

| | composition (wt %) | | | | | | | | | | |
|---|---|---|---|---|---|---|---|---|---|---|---|
| No. | C | Si | Mn | Cr | Ni | Mo | V | Nb | N | Mn/Ni | Fe |
| 1 | 0.12 | 0.01 | 0.24 | 11.5 | 2.75 | 2.0 | 0.20 | 0.07 | 0.05 | 0.08 | bal. |
| 2 | 0.10 | 0.02 | 0.38 | 11.8 | 2.09 | 2.0 | 0.29 | 0.05 | 0.07 | 0.18 | " |
| 3 | 0.10 | 0.09 | 0.71 | 12.0 | 2.41 | 1.9 | 0.29 | 0.04 | 0.06 | 0.30 | " |
| 4 | 0.08 | 0.15 | 0.82 | 11.9 | 1.62 | 2.5 | 0.27 | 0.06 | 0.07 | 0.51 | " |
| 5 | 0.09 | 0.09 | 0.84 | 11.8 | 2.10 | 2.3 | 0.35 | 0.05 | 0.07 | 0.40 | " |
| 6 | 0.10 | 0.04 | 0.15 | 10.9 | 2.51 | 2.4 | 0.19 | 0.06 | 0.06 | 0.06 | " |

Table 13 shows mechanical properties of these samples. Each of Sample Nos. 1 and 6 sufficiently satisfies the strength necessary for the material of the high temperature-high pressure gas turbine ($10^5$ h creep rupture strength at 450° C.: more than 50 kg/mm$^2$, V-notch Charpy impact value at 25° C. after embrittlement treatment: 4 kg-m (5 kg-m)/cm$^2$ or more). With respect to the mechanical properties of steels having the ratio Mn/Ni of 0.12 or more (Sample Nos. 3 to 7), the creep rupture strength can satisfy the value necessary for the material of the high temperature-high pressure gas turbine disk; however, a V-notch Charpy impact value after embrittlement is as low as 3.5 kg-m/cm$^2$ or less.

TABLE 13

| No. | tensile strength (kg/mm$^2$) | 0.2% proof stress (kg/mm$^2$) | elongation (%) | reduction (%) | 450° C. creep rupture strength (kg-mm$^2$) |
|---|---|---|---|---|---|
| 1 | 112.8 | 93.7 | 20.9 | 63.8 | 54.5 |
| 2 | 112.0 | 93.3 | 19.6 | 60.1 | 55.1 |
| 3 | 113.5 | 94.3 | 19.5 | 59.9 | 54.1 |
| 4 | 110.7 | 92.9 | 19.5 | 59.7 | 55.2 |
| 5 | 111.7 | 93.6 | 19.8 | 60.2 | 54.3 |
| 6 | 113.9 | 95.3 | 24.8 | 61.1 | 58.1 |

When the ratio (Mn/Ni) is 0.11 or less, the embrittlement is rapidly improved and thereby the impact value becomes 4 kg-m (5 kg-m)/cm$^2$ or more, and when the ratio (Mn/Ni) is 0.10 or less, the embrittlement is most preferably improved and thereby the impact value becomes 6kg-m (7.5 kg-m)/cm$^2$ or more. However, since Mn is an essential element as a deoxidizer and desulfurizer, it is preferably added in an amount of 0.05 to 0.20%. When the Ni content is 2.1% or less, the impact value can be slightly increased by reducing the Mn amount; however, the effect of improving the impact value can be more enhanced by setting the Ni content in a range of 2.1% or more, particularly, 2.4% or more and reducing the Mn amount.

When the Mn amount is close to 0.7%, the impact value is not improved irrespective of the Ni amount; however, if the Mn amount is set in a range of 0.6% or less, the impact value can be enhanced by setting the Ni amount in a range of 2.4% or more and reducing the Mn amount. In particular, for the Mn amount ranging from 0.15 to 0.4%, the impact value can be significantly improved by setting the Ni content in a range of 2.2% or more. Further, for the Mn amount ranging from 0.15 to 0.4%, an impact value of 6 kg-m (7.5 kg-m)/cm2 or more can be obtained by setting the Ni content in a range of 2.4% or more, and an impact value of 7 kg-m/cm$^2$ or more can be obtained by setting the Ni content in a range of 2.5% or more.

When the Ni content is less than about 2.5%, the $10^5$ h creep rupture strength (at 450° C.) is little changed; however, when the Ni content is more than 3.0%, the $10^5$ h creep rupture strength (at 450° C.) is less than 50 kg/mm$^2$, that is, less than a target value. In addition, it may be desirable to make small the Mn content for increasing the $10^5$ h creep rupture strength (at 450° C.). In particular, when the Mn content is in a range of 0.15 to 0.25%, the $10^5$ h creep rupture strength (at 450° C.) is maximized.

The steel having a chemical composition being substantially the same as that shown in Table 12 was melted by the carbon vacuum deoxidization process, being cast in a mold, and the casing was forged into a disk shape. The forged disk was heated at 1050° C. for 2 hr and quenched in oil kept at 150° C., and then subjected to tempering. The tempering was performed by heating the forged disk at 520° C. for 5 hr and air-cooling it and heating again the forged product at 590° C. for 5 hr and air-cooling it. The disk thus heat-treated, having an outside diameter of 1000 mm and a thickness of 200 mm, was machined into a shape shown in the figure. The disk was used for each of the turbine disks 11, 12 and 13. Each turbine disk has at its center portion a through-hole for allowing a coolant to pass therethrough, and a hole in which the stacking bolt 54 is to be inserted. The disk has the same characteristics as those described above, that is, the impact value after embrittlement of 8.0 kg-m (10 kg-m)/cm$^2$ and the $10^5$ creep rupture strength of 55.2 kg/mm$^2$.

Table 14 shows the material composition (wt %) used for each member of the gas turbine in this embodiment. In addition, the materials shows in Table 12 can be used for the distant piece, the compressor final stage disk, the turbine spacer, and the turbine stacking bolt. Each steel was melted by the electro slag remelting process, being cast in a mold, and forged and heat-treated. The casting was performed at a temperature ranging from 850 to 1150° C., and the heat-treatment was performed under the condition shown in Table 14. The macro-structures of these materials were as follows: namely, each of Sample Nos. 10 to 15 exhibited a full-temper martensite structure, and each of Sample Nos. 14 and 15 exhibited a full-temper bainite structure. Sample No. 10 was used for the distant piece having a size of 60 mm (thickness)×500 mm (width)×1000 mm (length), and Sample No. 11 was used for the compressor final stage disk having a size of 1000 mm (diameter)×180 mm (thickness). Sample No. 7 was used for a disk having a size of 1000 mm (diameter)×180 mm (thickness); Sample No. 12 was used for a spacer having a size of 1000 mm (outside diameter)× 400 mm (inside diameter)×100 mm (thickness); Sample No. 13 was used for the stacking bolt, having a size of 40 mm (diameter)×500 mm (length), of either the turbine or compressor; Sample No. 13 was used for a bolt for connecting the distant piece to the compressor disk; and Samples Nos. 14 and 15 were used for a turbine stub shaft having a size of 250 mm (diameter)×300 mm (length) and for the compressor stub shaft having a size of 250 mm (diameter)×300 mm (length), respectively. Further, the alloy of Sample No. 14 was used for each of the thirteenth to sixteenth stage disks 6 of the compressor, and the steel of Sample No. 15 was used for each of the first to twelfth stage disks 6 of the compressor. These members were each produced in accordance with the same procedure as that for the turbine disk. For the samples excluding Sample No. 13, after the heat-treatment, the test piece was taken from the center portion of each sample in the direction perpendicular to the axial (longitudinal) direction, and for Sample No. 13, the test piece was taken from the center portion of the sample in the direction along the longitudinal direction.

The temperature of the distant piece and the temperature of the final stage compressor disk are each increased up to 450° C. The wall thickness of the distant piece is preferably in a range of 25 to 30 mm and the wall thickness of the compressor disk is preferably in a range of 40 to 70 mm. Each of the turbine disk and the compressor disk has a though-hole at its center. A compression residual stress occurs in the though-hole of the turbine disk.

TABLE 14

| No. | composition (wt %) | | | | | | | | | | heat treatment |
|---|---|---|---|---|---|---|---|---|---|---|---|
| | C | Si | Mn | Cr | Ni | Mo | V | Nb | N | Fe | |
| 10 (distant piece) | 0.10 | 0.40 | 0.70 | 11.56 | 1.98 | 1.98 | 0.20 | 0.08 | 0.06 | bal. | 1050° C. × 5 hOQ 550° C. × 15 hAC 600° C. × 15 hAC |
| 11 (compressor disks) | 0.10 | 0.05 | 0.65 | 11.49 | 1.70 | 2.04 | 0.19 | 0.08 | 0.06 | " | 1050° C. × 8 hOQ 550° C. × 20 hAC 600° C. × 20 hAC |
| 12 (turbine spacer) | 0.09 | 0.07 | 0.59 | 11.57 | 2.31 | 2.22 | 0.18 | 0.09 | 0.06 | " | 1050° C. × 3 hOQ 550° C. × 10 hAC 600° C. × 10 hAC |
| 13 (turbine stacking bolt) | 0.10 | 0.03 | 0.69 | 11.94 | 1.86 | 2.25 | 0.21 | 0.15 | 0.05 | " | 1050° C. × 1 hOQ 550° C. × 2 hAC 600° C. × 2 hAC |
| 14 CrMoV steel | 0.26 | 0.25 | 0.79 | 1.09 | 0.41 | 1.25 | 0.23 | — | — | " | 975° C. × 8 hWQ 665° C. × 25 hAC 665° C. × 25 hAC |
| 15 NiCrMoV steel | 0.20 | 0.21 | 0.36 | 1.51 | 2.78 | 0.62 | 0.10 | — | — | " | 840° C. × 8 hWQ 635° C. × 25 hAC 635° C. × 25 hAC |

Table 13 shows the results of a tensile test (at room temperature), V-notch Charpy impact test (at 20° C.) and a creep rupture test. The $10^5$ h creep rupture strength (at 450° C.) was obtained by the usual Larsson-Miller process.

Each of Sample Nos. 10 to 13 (12Cr steel) of the present invention exhibits a $10^5$ h creep rupture strength (at 450° C.) of 51 kg/mm$^2$ or more and a V-notch Charpy impact value (at 20° C.) of 7 kg-m/cm$^2$ or more, and therefore, sufficiently satisfies the strength necessary for the material of the high-temperature gas turbine.

Each of Sample Nos. 14 and 15 (low alloy steel) for the stub shaft exhibits a low creep rupture strength (at 450° C.) but a tensile strength of 86 kg/mm$^2$ or more, and a V-notch Charpy impact value (at 20° C.) of 7 kg-m/cm$^2$ or more, and therefore, sufficiently satisfies the strength necessary for the stub shaft (tensile strength≧81 kg/mm$^2$, notching Charpy impact value (at 20° C.)≧-5 kg-m/cm$^2$).

The turbine blade, nozzle, combustor liner, compressor blade, nozzle, shroud segment, and diaphragm are made from alloys shown in Table 16.

Since the turbine disk is suitably cooled as described above, it can be made from a martensite steel containing alloy elements in low amounts and having a high toughness. Accordingly, the gas turbine using such turbine disks can be rapidly started/stopped upon starting/stopping operation, thereby shortening a time required upon starting/stopping operation.

The gas turbine of the present invention, which is configured by combination of the above-described materials, exhibits a rating power of 150 MW, a rating rotational speed of 3600 rpm, a compression ratio of 3.7, and a first stage nozzle inlet gas temperature of about 1260° C.; and exhibits a heat efficiency of 34.5% in LHV.

TABLE 15

| | tensile strength (kg/mm$^2$) | 0.2% proof stress (kg/mm$^2$) | elongation (%) | reduction (%) | impact value vE$_{20}$(kg-m/cm$^2$) | creep rupture strength (kg/mm$^2$) 450° C. |
|---|---|---|---|---|---|---|
| 10 | 112.0 | 79.3 | 19.8 | 60.1 | 8.7 | 51.1 |
| 11 | 111.7 | 79.5 | 20.1 | 59.3 | 8.3 | 52.3 |
| 12 | 114.3 | 81.2 | 19.5 | 62.5 | 7.2 | 51.3 |
| 13 | 115.7 | 82.6 | 22.3 | 63.4 | 8.7 | 52.7 |
| 14 | 86.4 | — | 26.7 | 68.8 | 7.5 | 32.2 |
| 15 | 86.8 | 77.1 | 26.9 | 69.1 | 18.2 | 23 |

TABLE 16

|  | C | Si | Mn | Cr | Ni | Co | Fe | Mo | B | W | Ti | other |
|---|---|---|---|---|---|---|---|---|---|---|---|---|
| turbine blade | 0.15 | 0.11 | 0.12 | 15.00 | bal. | 9.02 | — | 3.15 | 0.015 | 3.55 | 4.11 | Zr 0.05, Al 5.00 |
| turbine nozzle | 0.43 | 0.75 | 0.66 | 29.16 | 10.18 | bal. | — | — | 0.010 | 7.11 | 0.23 | Nb 0.21, Zr 0.15 |
| combustor liner | 0.07 | 0.83 | 0.75 | 22.13 | bal. | 1.57 | 18.47 | 9.12 | 0.008 | 0.78 | — | — |
| compressor blade, nozzle | 0.11 | 0.41 | 0.61 | 12.07 | 0.31 | — | bal. | — | — | — | — | — |
| shroud segment (1) | 0.08 | 0.87 | 0.75 | 22.16 | bal. | 1.89 | 18.93 | 9.61 | 0.005 | 0.85 | — | — |
| (2) | 0.41 | 0.65 | 1.00 | 23.55 | 26.63 | — | bal. | — | — | — | 0.25 | Nb 0.33 |
| diaphragm | 0.025 | 0.81 | 1.79 | 19.85 | 11.00 | — | " | — | 1 | — | — | — |

The turbine disk 13 in this embodiment is made from each martensite steel shown in Table 17.

TABLE 17

| No. | C | Si | Mn | Ni | Cr | Mo | V | N | Fe |
|---|---|---|---|---|---|---|---|---|---|
| 1 | 0.11 | 0.20 | 0.70 | 1.67 | 11.70 | 3.03 | 0.20 | 0.101 | bal. |
| 2 | 0.09 | 0.07 | 0.10 | 2.59 | 11.49 | 1.99 | 0.20 | — | " |

A combined power generation plant including the gas turbine in this embodiment combined with the high pressure-low pressure integral type steam turbine described in the first embodiment exhibited a generation end heat efficiency of about 47%. The main specification of the high pressure-low pressure integral type steam turbine is as follows: namely, the steam temperature is 538° C., and the blade portion length of the final stage blade is 33.5 inches.

Industrial Applicability

According to the present invention, there can be obtained a gas turbine operated at a turbine nozzle inlet temperature ranging from 1200 to 1650° C., which can exhibit a high efficiency of 37% or more in LHV by adopting a specific material configuration and a specific cooling structure for turbine blades, nozzles, and disks. Further, there can be achieved a combined power generation system including the above gas turbine combined with a high pressure-intermediate pressure-low pressure integral type steam turbine configured by combination of a rotor shaft and a final stage blade made from suitable materials, which plant can exhibit a heat efficiency of 50% or more in HHV.

What is claimed is:

1. A gas turbine for power generation, including a compressor, a combustor, at least three stages of turbine blades fixed to turbine disks, and at least three stages of turbine nozzles corresponding to said stages of turbine blades, characterized in that said gas turbine has a steam cooling line for cooling said turbine disks by flowing steam from a center of rotation axis of said turbine disks to an inside of each of said turbine blades on first and second stages of said turbine blades and inside of each of said nozzles on a first stage of said turbine nozzles; and said turbine disks on all the stages are made of a martensite steel by weight of 0.05–0.20% of C, 0.15% or less of Si, 0.20% or less of Mn, 0.50–3.0% of Ni, 8.0–13.0% of Cr, 1.0–4.0% of Mo, 0.10–0.40% of V, 0.01–0.20% of Nb, 1.0–5.0% of Co, and 0.025–0.125% of N.

2. A gas turbine for power generation according to claim 1, wherein said martensite steel further contains one kind or more of 0.2–2.0% of W and 0.0005–0.10% of B.

3. A gas turbine for power generation according to claim 1, wherein at least one of said first stage turbine blade and said first stage turbine nozzle is made from an Ni-based alloy having a single crystal or columnar crystal structure.

4. A gas turbine for power generation according to claim 1, wherein said second and third stage turbine blades are each made from a unidirectionally solidified Ni-based alloy having a columnar crystal structure.

5. A gas turbine for power generation according to claim 1, wherein said first stage turbine blade and said first stage turbine nozzle are each made from an Ni-based alloy having a single crystal structure; at least one of said second and third stage turbine blades is made from a unidirectionally solidified Ni-based alloy having a columnar crystal structure; and said second and third stage turbine nozzles are each made from an Ni-based alloy having an equi-axed crystal structure.

6. A combined power generation system comprising:

a gas turbine according to claim 1;

a combustor for producing a combustion gas for driving said gas turbine;

an exhaust gas heat recovery boiler for producing steam by using exhaust gas discharged from said gas turbine;

a high pressure-low pressure integral type steam turbine driven by steam from said boiler; and a generator driven by said gas turbine sand said steam turbine.

7. A combined power generation system according to claim 6 wherein a steam temperature at an inlet of a first stage nozzle of said steam turbine and a gas temperature at an inlet of a first stage nozzle of said gas turbine are in a range defined by connecting to each other on a steam temperature/gas temperature diagram a first point A at a steam temperature of 515° C. and a gas temperature of 1200° C., a second point B at a steam temperature of 538° C. and a gas temperature of 1200° C., a third point C at a stem temperature of 593° C. and a gas temperature of 1650° C. and a fourth point D at a steam temperature of 557° C. and a gas temperature of 1650° C.

* * * * *